(12) United States Patent
Spagnolia et al.

(10) Patent No.: US 8,804,101 B2
(45) Date of Patent: Aug. 12, 2014

(54) PERSONAL LADAR SENSOR

(75) Inventors: Joseph Spagnolia, Ventura, CA (US); Howard Bailey, Santa Barbara, CA (US); Patrick Gilliland, Santa Barbara, CA (US); Barton Goldstein, Santa Barbara, CA (US); Brad Short, Goleta, CA (US); Laurent Heughebaert, Santa Paula, CA (US); Roger Stettner, Santa Barbara, CA (US)

(73) Assignee: Advanced Scientific Concepts, Inc., Santa Barbara, CA (US)

( * ) Notice: Subject to any disclaimer, the term of this patent is extended or adjusted under 35 U.S.C. 154(b) by 207 days.

(21) Appl. No.: 13/422,988

(22) Filed: Mar. 16, 2012

(65) Prior Publication Data

US 2013/0242283 A1    Sep. 19, 2013

(51) Int. Cl.
*G01C 3/08* (2006.01)
(52) U.S. Cl.
USPC ........ 356/4.01; 356/5.02; 356/5.03; 250/332; 250/339.02; 977/755; 977/775; 977/734
(58) Field of Classification Search
USPC ............. 356/3.01–3.16, 4.01–4.1, 5.01–5.15; 250/332, 339.02; 977/755, 775, 734
See application file for complete search history.

(56) References Cited

U.S. PATENT DOCUMENTS

| 4,846,949 | A | | 7/1989 | Tu et al. | |
|---|---|---|---|---|---|
| 5,446,529 | A | * | 8/1995 | Stettner et al. | 356/4.01 |
| 5,629,524 | A | | 5/1997 | Stettner et al. | |
| 5,696,577 | A | * | 12/1997 | Stettner et al. | 356/4.01 |
| 6,133,989 | A | * | 10/2000 | Stettner et al. | 356/4.01 |
| 6,362,482 | B1 | | 3/2002 | Stettner et al. | |
| 6,414,746 | B1 | * | 7/2002 | Stettner et al. | 356/4.01 |
| 7,296,749 | B2 | | 11/2007 | Massieu | |
| 7,303,937 | B2 | | 12/2007 | Chen et al. | |
| 7,384,666 | B2 | | 6/2008 | Suzuki et al. | |
| 7,652,752 | B2 | * | 1/2010 | Fetzer et al. | 356/4.01 |
| 7,830,442 | B2 | * | 11/2010 | Griffis et al. | 348/340 |
| 7,961,301 | B2 | * | 6/2011 | Earhart et al. | 356/4.01 |
| 2002/0117340 | A1 | | 8/2002 | Stettner | |
| 2006/0232760 | A1 | * | 10/2006 | Asbrock et al. | 356/4.03 |
| 2008/0211955 | A1 | | 9/2008 | Avital et al. | |
| 2010/0309288 | A1 | * | 12/2010 | Stettner et al. | 348/43 |
| 2012/0154785 | A1 | * | 6/2012 | Gilliland et al. | 356/5.01 |

OTHER PUBLICATIONS

Greenberg, M. R., Smolyakov, G. A., Boyle, T. J., and Osinski, M., "Synthesis and characterization of ZnO colloidal nanocrystals", Technical Digest, Twenty Seventh Annual Conference on Lasers and Electro-Optics CLEO 2007, Baltimore, Maryland, May 6-11, 2007, Paper CMO2.

(Continued)

*Primary Examiner* — Isam Alsomiri
*Assistant Examiner* — Assres H Woldemaryam
(74) *Attorney, Agent, or Firm* — Felix L. Fischer

(57) ABSTRACT

A lightweight, low volume, inexpensive LADAR sensor incorporating 3-D focal plane arrays is adapted specifically for personal electronic appliances. The present invention generates, at high speed, 3-D image maps and object data at short to medium ranges. The techniques and structures described may be used to extend the range of long range systems as well, though the focus is on compact, short to medium range ladar sensors suitable for use in personal electronic devices. 3-D focal plane arrays are used in a variety of physical configurations to provide useful new capabilities to a variety of personal electronic appliances.

70 Claims, 16 Drawing Sheets

(56) References Cited

OTHER PUBLICATIONS

Osinski, M., Sankar, K., Akins, B. A., Memon, T. A., Withers, N. J. and Smolyakov, G. A., "Synthesis and characterization of ZnO/ZnS core/shell nanocrystals", Invited Paper, Proceedings of the 2007 US-Korea Conference on Science, Technology, and Entrepreneurship (UKC2007), Global Challenges in Science and Technology, Symposium NST: Nano Science and Technology, Reston, Virginia, Aug. 9-12, 2007, Paper NST-7.2.

* cited by examiner

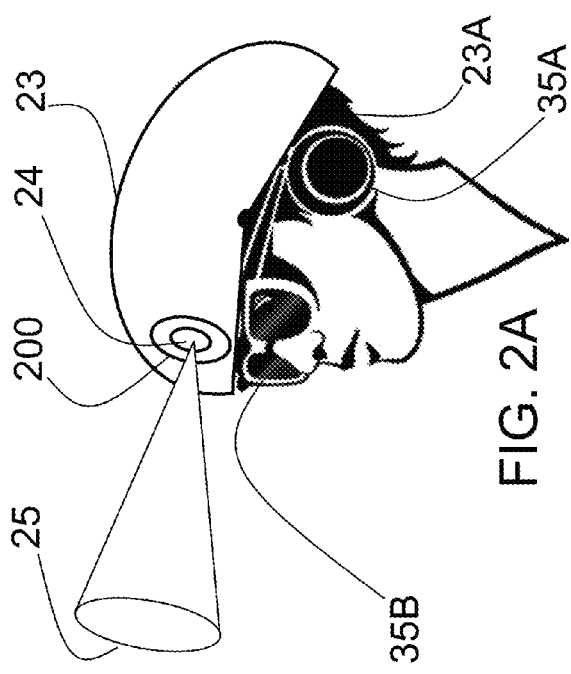
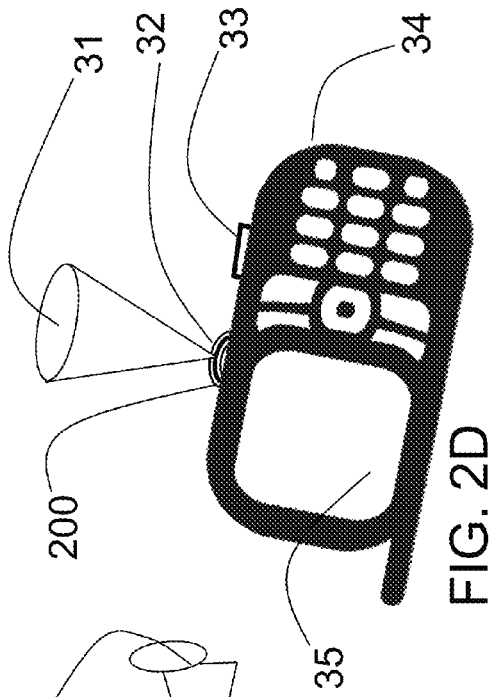
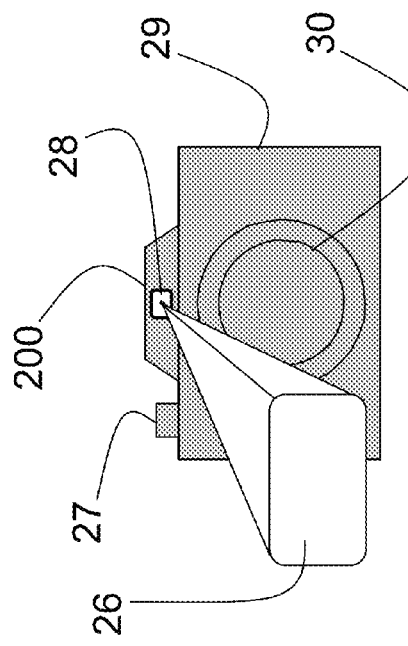
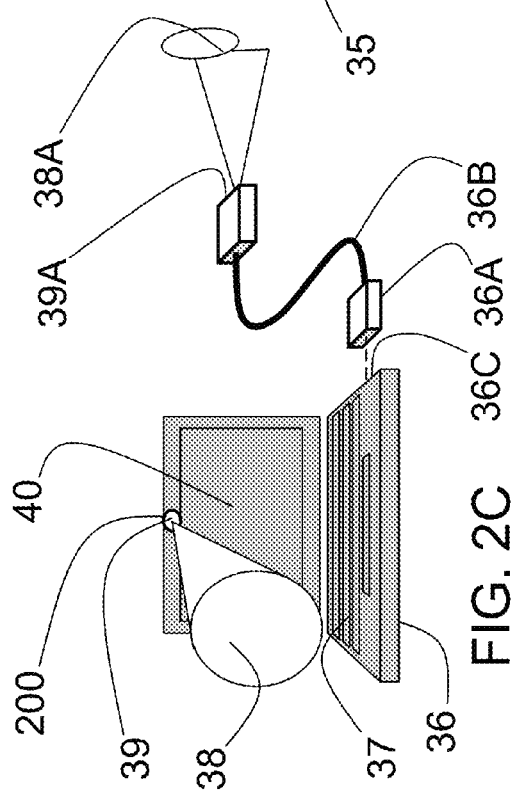

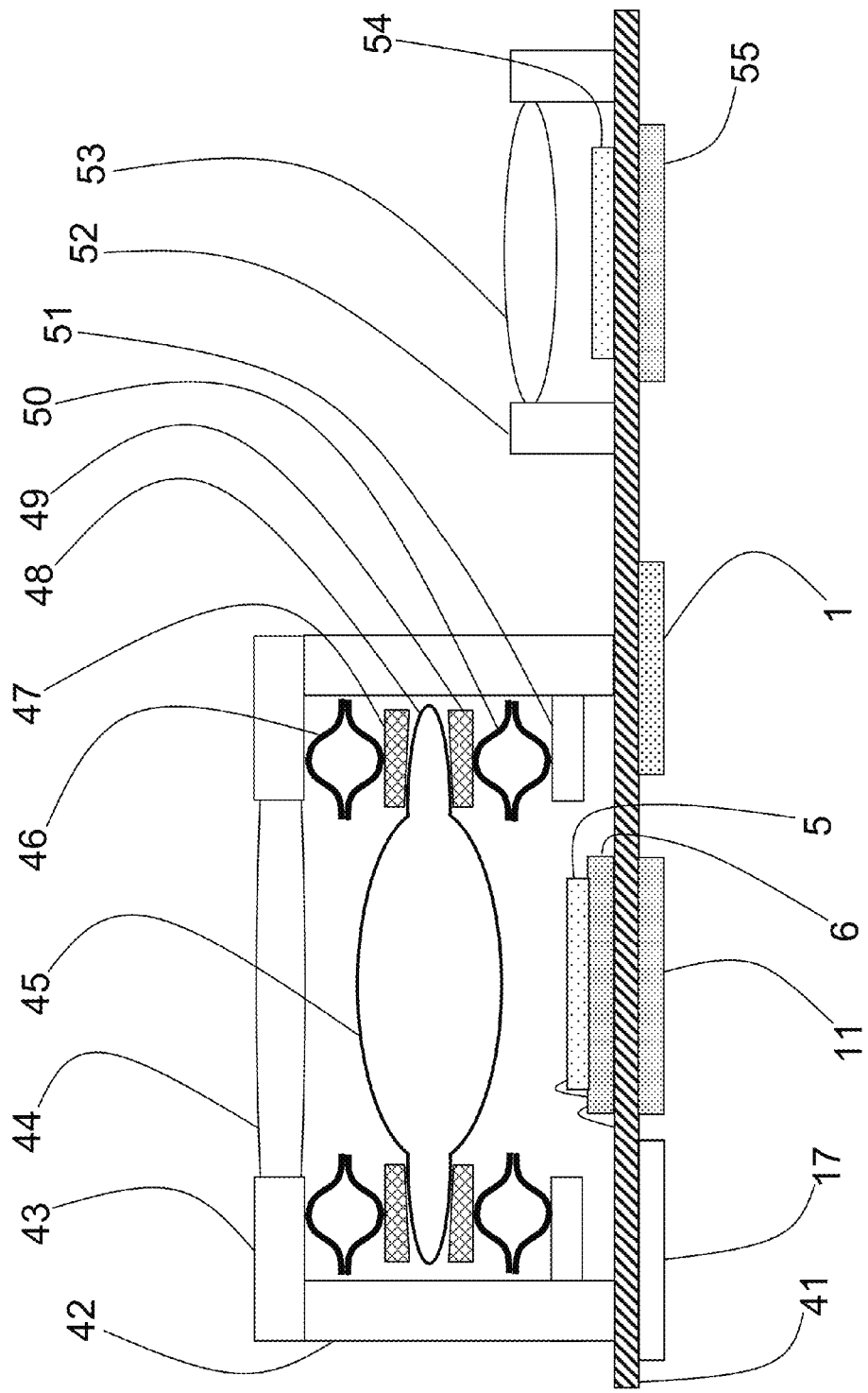

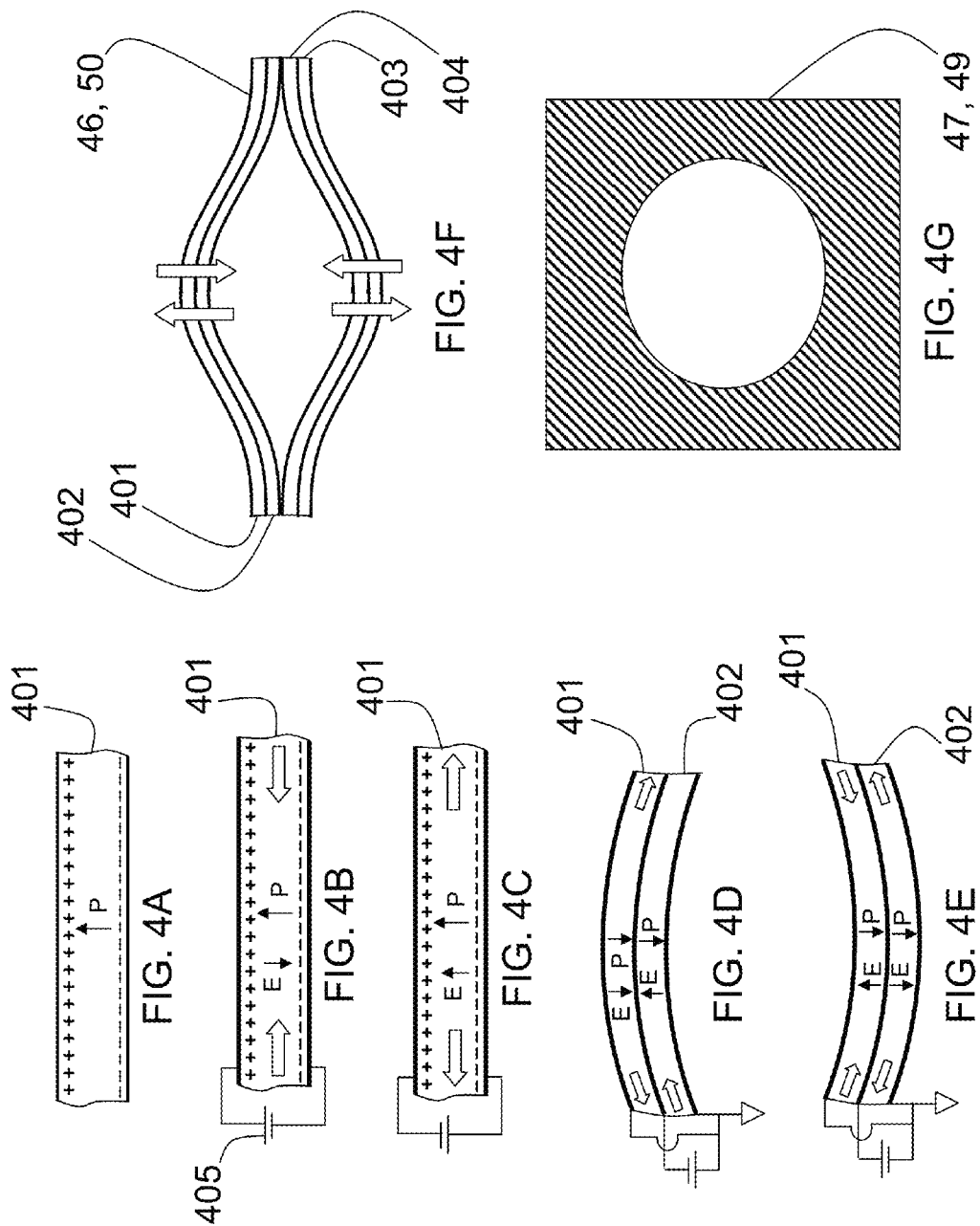

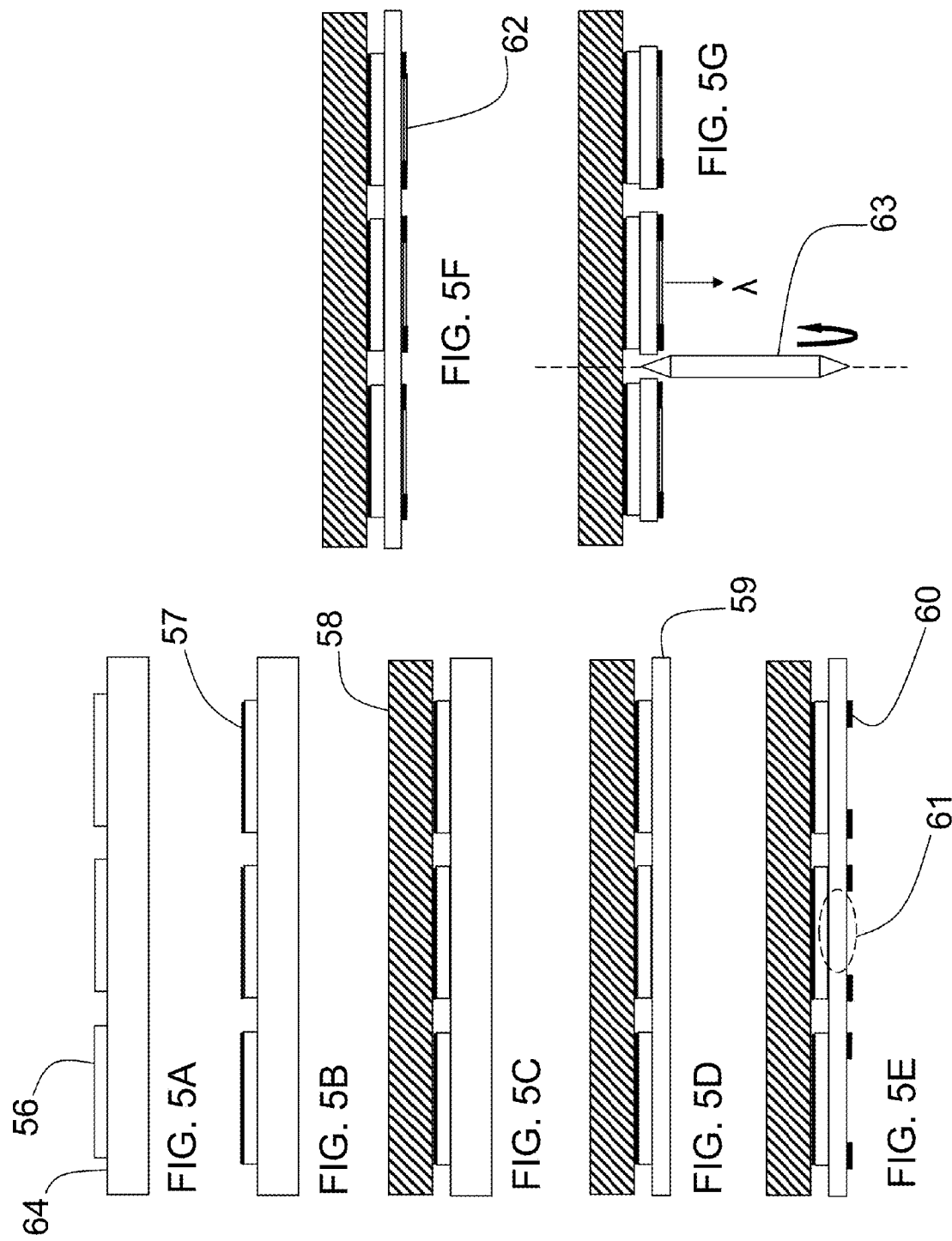

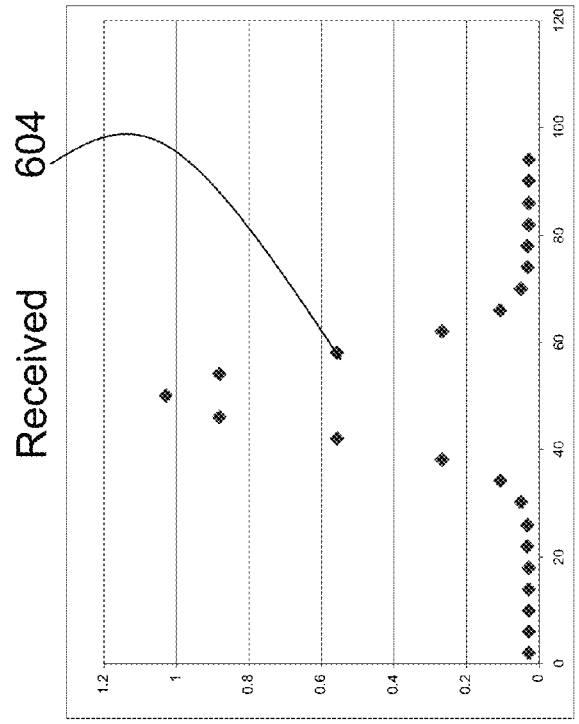
FIG. 6B
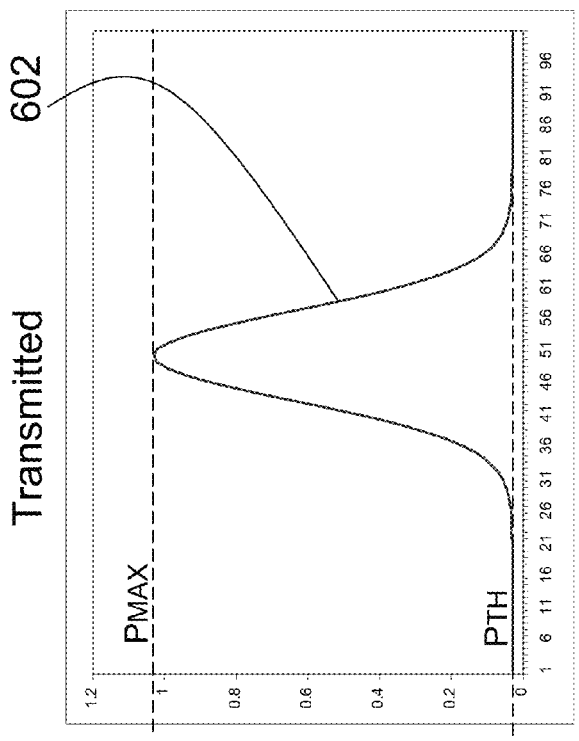
Gaussian Pulse: $P(t) = P_{TH} + ae^{-(t-b)^2/2c^2}$
FIG. 6A
Barker Codes:
| Length | Code |
|---|---|
| 7 | 1,1,1,0,0,1,0 |
| 11 | 1,1,1,0,0,0,1,0,0,1,0 |
| 13 | 1,1,1,1,1,0,0,1,1,0,1,0,1 |
FIG. 6G

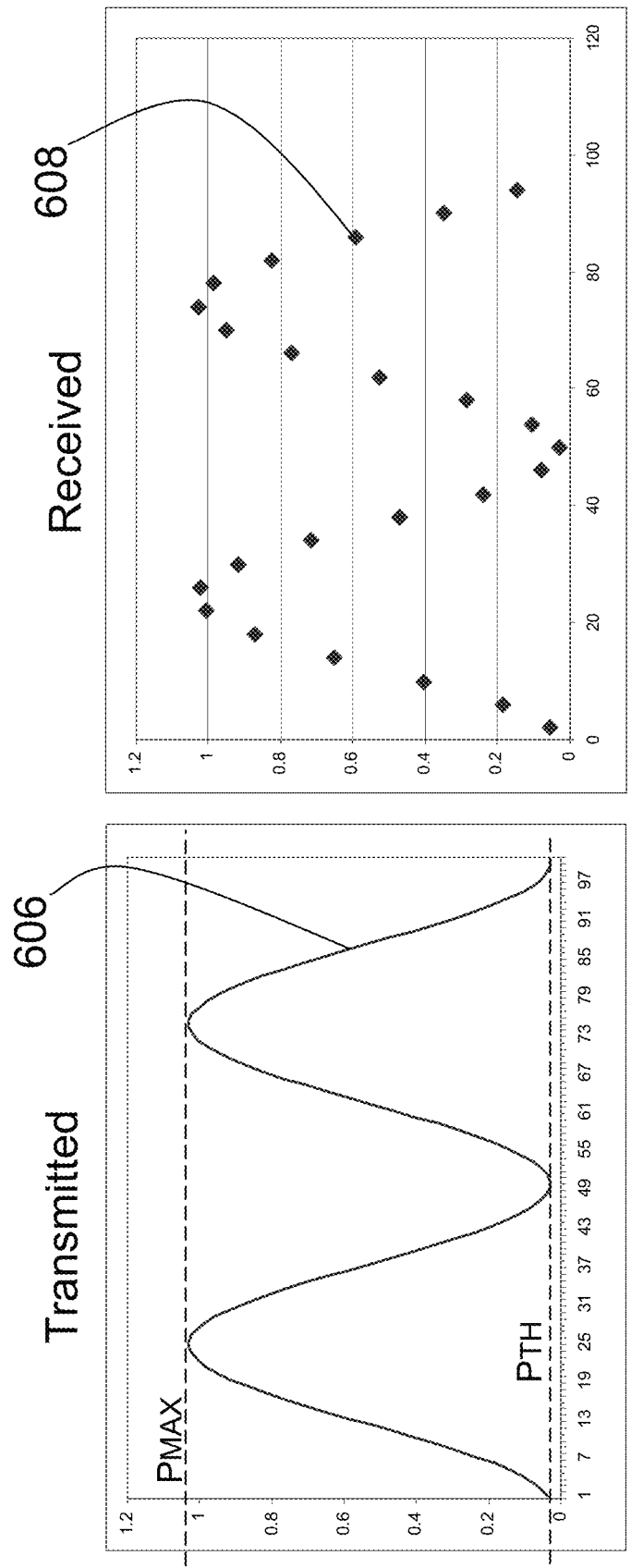

$P(t) = P_{TH} + a(0.5 + \sin(2\pi t^2/b + \varphi))$

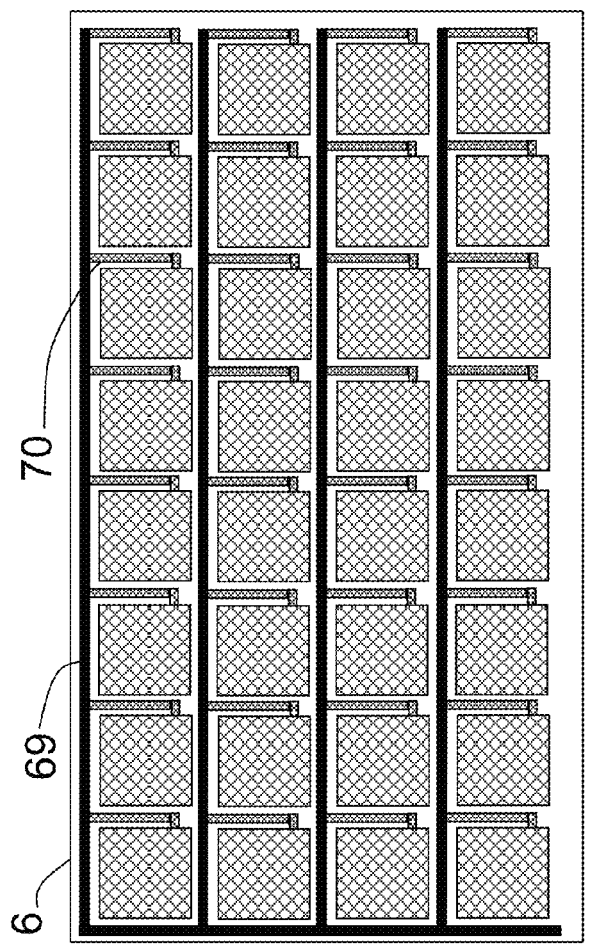
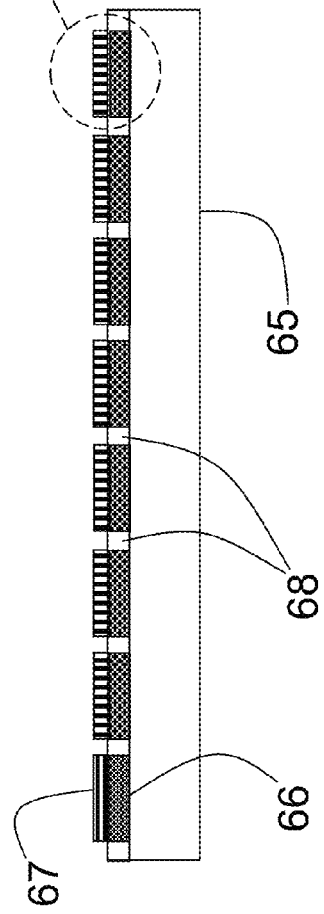
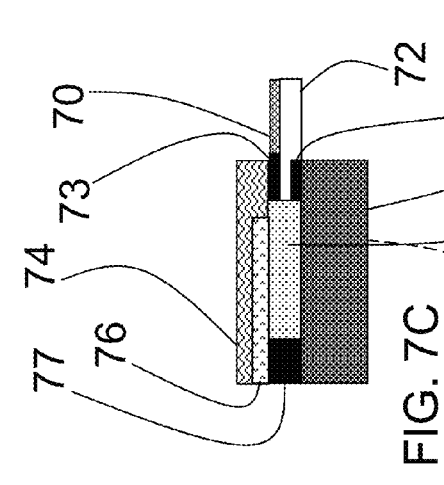
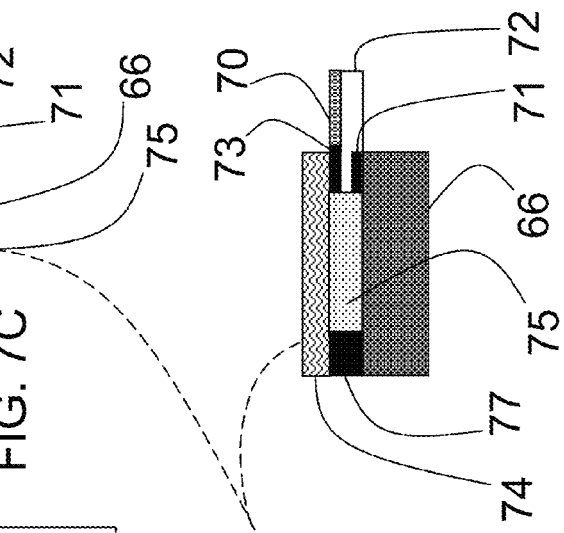
FIG. 7A
FIG. 7B
FIG. 7C
FIG. 7D

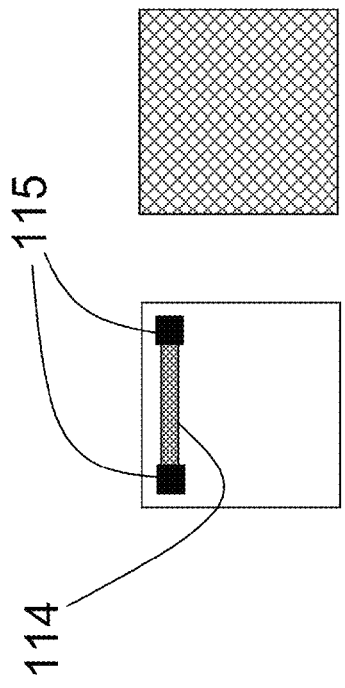
FIG. 8D
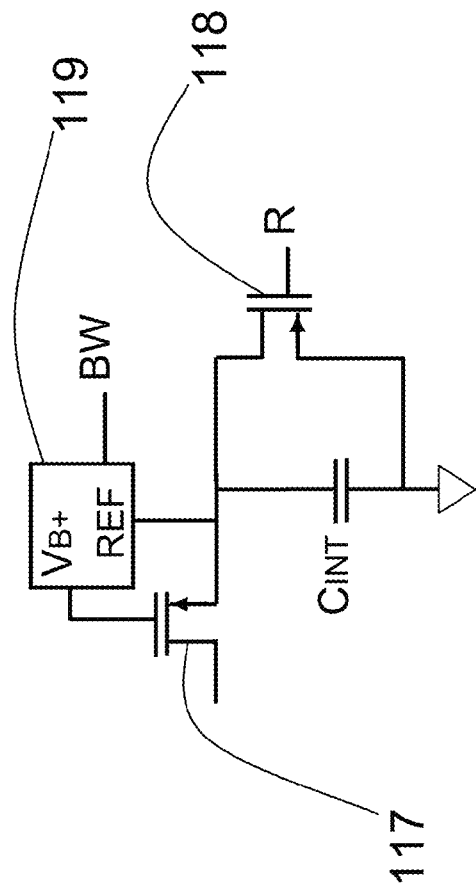
FIG. 8E
FIG. 8G
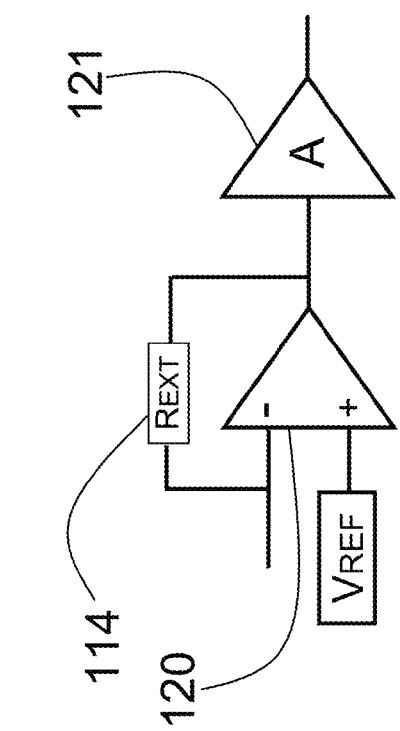
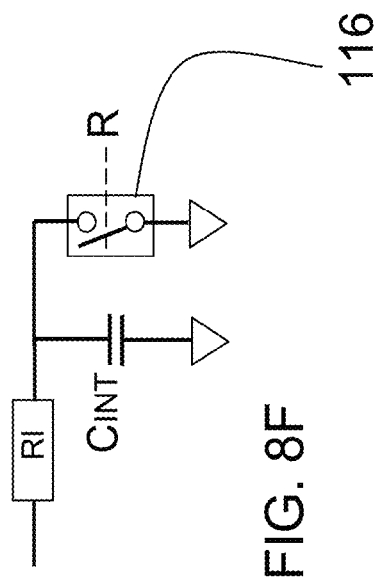
FIG. 8F

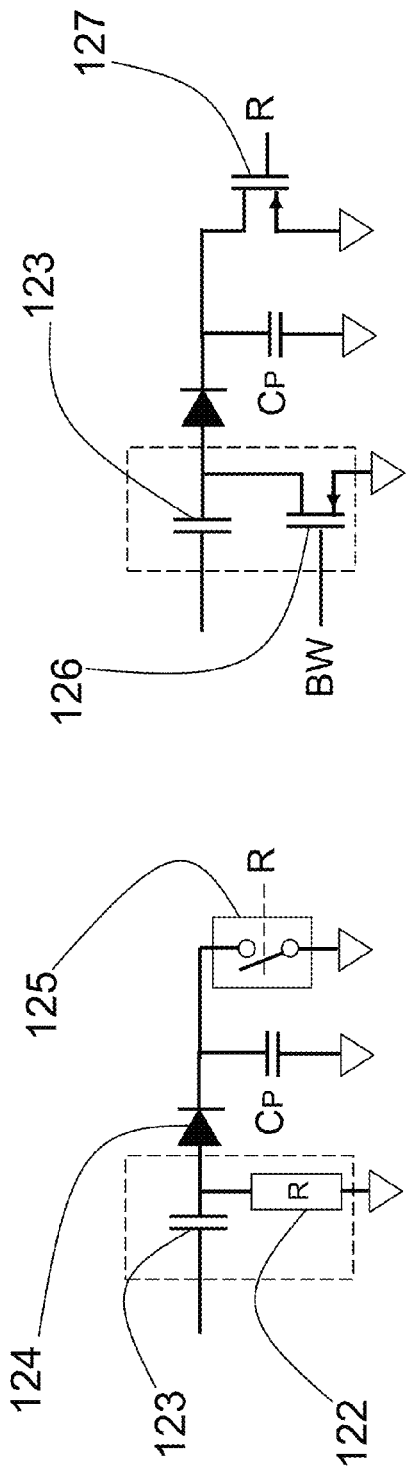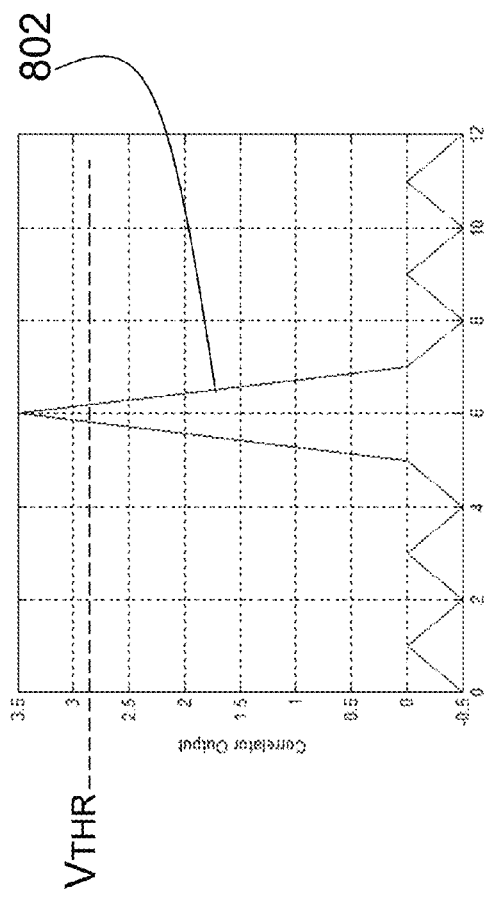

PERSONAL LADAR SENSOR

BACKGROUND

1. Field

The embodiments disclosed herein relate generally to image generation and recording and more particularly to a compact ladar for incorporation in a personal electronic appliance or head gear such as a helmet.

2. References to Related Art

The 3-D imaging technology disclosed in Stettner et al, U.S. Pat. Nos. 5,446,529, 6,133,989 and 6,414,746 provides with a single pulse of light, typically pulsed laser light, all the information of a conventional 2-D picture along with the third dimensional coordinates; it furnishes the 3-D coordinates of everything in its field of view. This use is typically referred to as flash 3-D imaging in analogy with ordinary digital 2-D cameras using flash attachments for a self contained source of light. As with ordinary 2-D digital cameras, the light is focused by a lens on the focal plane of the LADAR sensor, which contains an array of pixels called a focal plane array (FPA). In the case of a LADAR sensor these pixels are "smart" and can collect data from which the time of flight of the laser pulse to the object of interest can be calculated. Each smart pixel also collects data associated with the returning laser pulse shape and magnitude.

One value of these flash LADAR sensors, as opposed to competing designs in which one or more pixels is scanned over the field of view, is the elimination of the precision mechanical scanner, which is costly, high maintenance and typically large and heavy. The pixels in the focal plane of a flash LADAR sensor are automatically registered due to their permanent positions within the array. Further, by capturing a frame of data as opposed to one or a few pixels with one laser pulse, the data rate is greatly increased while weight and volume are reduced. Because each frame of data is captured from the reflection of a short duration laser pulse, moving objects or surfaces of stationary objects may be captured from a moving platform without blurring or distortion.

It is therefore desirable to provide a device to generate 3D data for personal use in avoiding obstacles in dark, foggy, or smoke-filled environments, or to create digital 3D imagery for use in entertainment, surveillance, surveying, or estimating. It is further desirable that the device provide mechanical simplicity and high data rate with low weight, low volume, and low cost for use as a personal item.

SUMMARY OF THE INVENTION

The embodiments disclosed herein provide a device for personal scene detection using a personal ladar sensor with a field of view and a wavelength of operation mounted to a personal electronic device. The personal ladar sensor is mounted inside a radome attached to the personal electronic device, having at least one transparent surface capable of transmitting light at the wavelength of operation. The personal ladar sensor further includes a semiconductor laser with a modulated laser light output and a diffusing optic for illuminating a scene in the field of view of the personal ladar sensor and a two dimensional array of light sensitive detectors positioned at a focal plane of a light collecting and focusing system. Each of the light sensitive detectors has an output producing an electrical response signal from a reflected portion of the modulated laser light output and a readout integrated circuit with multiple unit cell electrical circuits. Each of the unit cell electrical circuits has an input connected to one of the light sensitive detector outputs, an electrical response signal demodulator, and a range measuring circuit connected to an output of the electrical response signal demodulator. The range measuring circuit is further connected to a reference signal providing a zero range reference for the said modulated laser light output. The personal ladar sensor further incorporates a detector bias circuit connected to at least one voltage distribution grid of the detector array and a temperature stabilized frequency reference.

The features, functions, and advantages that have been discussed can be achieved independently in various embodiments of the present disclosure or may be combined in yet other embodiments, further details of which can be seen with reference to the following description and drawings.

BRIEF DESCRIPTION OF THE DRAWINGS

FIG. 2A shows a helmet or other headgear suitable for the integration of a personal ladar sensor of the type described herein;

FIG. 2B shows a camera suitable for the integration of a personal ladar sensor of the type described herein;

FIG. 2C shows a portable computer suitable for the integration of a personal ladar sensor of the type described herein;

FIG. 2D shows a cellphone suitable for the integration of a personal ladar sensor of the type described herein;

FIG. 3 shows several features of the low cost and compact construction of the personal ladar sensor;

FIGS. 4A-F are diagrams which illustrates the functioning of the piezoelectric actuators employed for the microfluidic lens actuating mechanism;

FIG. 4G is a plan view of the actuator plates of FIG. 3;

FIG. 5 is a sequence of drawings illustrating the steps necessary to produce a vertical cavity surface emitting laser or laser array at the eye safe wavelength of the present design;

FIGS. 6A and 6B show a typical single pulse laser transmission and the sampled results of the laser pulse reflected from a scene in the field of view of the personal ladar;

FIGS. 6C and 6D show a pulsed sinewave laser transmission and the sampled results of the pulsed sinewave laser transmission which has been reflected from a scene in the field of view of the personal ladar;

FIG. 6G shows a table of Barker Codes;

FIGS. 7A-7D are representative diagrams showing a readout integrated circuit of the instant invention which has been merged with the focal plane array detector elements comprised of quantum dot solids;

FIG. 8D shows a detailed circuit of the transimpedance amplifier of FIG. 8B;

FIG. 8E shows an example unit cell surface;

FIG. 8F shows a detailed circuit of an integrator with reset for the unit cell electronics common to the readout integrated circuit detailed in FIG. 8B;

FIG. 8G shows an integrator with bandwidth control for the unit cell electronics common to the readout integrated circuit detailed in FIG. 8B;

FIG. 8H shows a detailed circuit of the peak detector with reset for the unit cell electronics common to the readout integrated circuit detailed in FIG. 8B;

FIG. 8I shows a detailed circuit of the peak detector with adjustable HPF for the unit cell electronics common to the readout integrated circuit detailed in FIG. 8B;

FIG. 8J shows a graph of barker 7 code autocorrelation;

DETAILED DESCRIPTION

Figure 1:
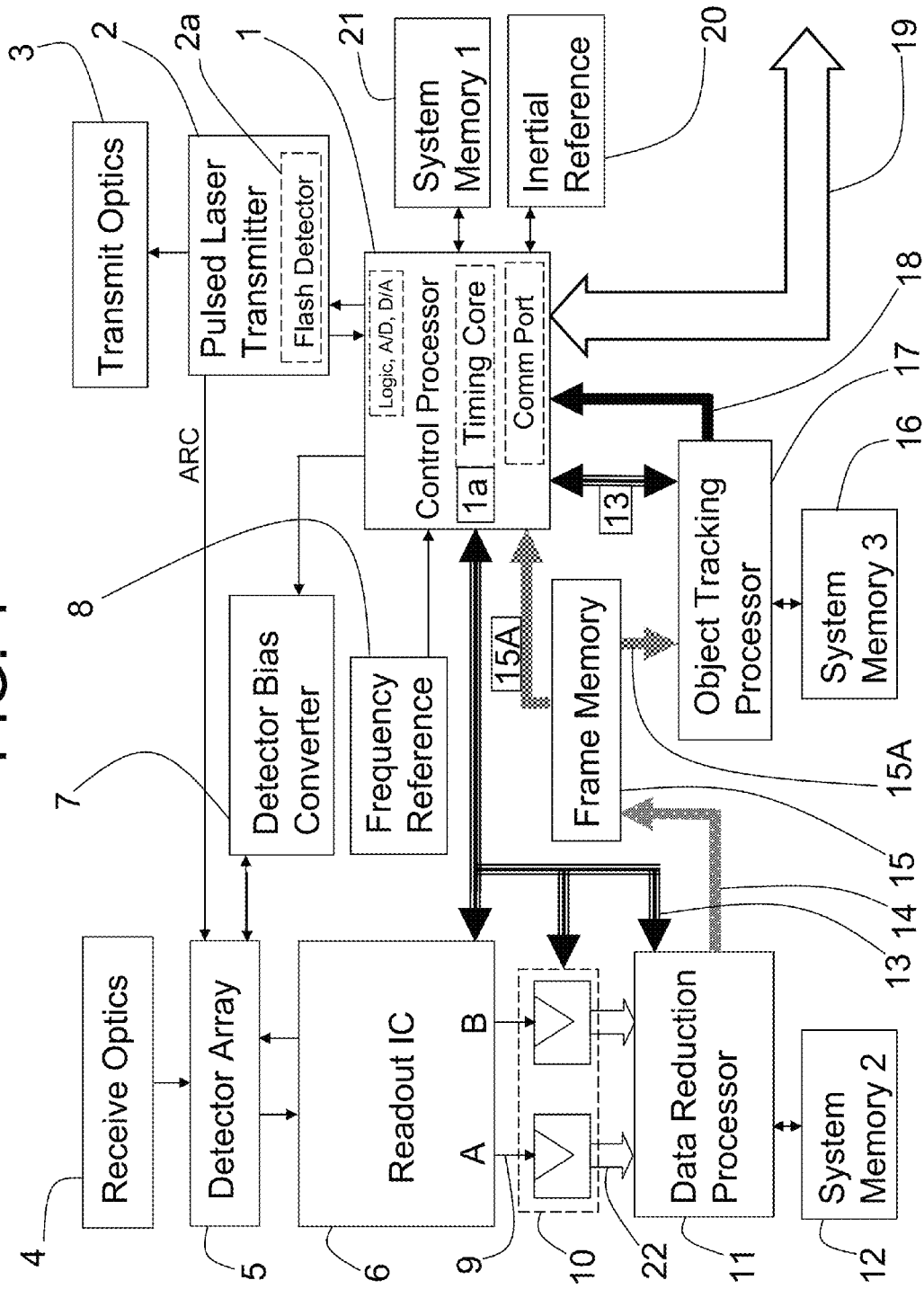
FIG. 1 is a system block diagram of the present invention adapted for mounting in a personal electronic device, headgear or wearable item.

This application contains new subject matter related to previous U.S. Pat. Nos. 5,696,577, 6,133,989, 5,629,524, 6,414,746, 6,362,482, and U.S. patent application Ser. No. 10/066,340 filed on Jan. 31, 2002 and published as US 2002/0117340 A1, the disclosures of which are incorporated herein by reference.

The present invention is embodied in a personal electronic appliance or a wearable item such as a helmet or headgear and provides a device which creates scene detection generally referred to herein as a personal ladar. The personal ladar includes a system control processor with frequency reference and inertial reference, a system memory, a pulsed laser transmitter, transmit optics, receive optics, an array of light detecting elements positioned at a focal plane of the receive optics, a detector bias converter for supplying bias voltage to the light detecting focal plane array, a readout integrated circuit, analog-to-digital converter circuits for producing digital image data from the analog readout IC outputs, a data reduction processor for adjusting and correcting the image data, and an object tracking processor for identifying and tracking features and objects in the corrected image database. When used with visual feedback or audio feedback mechanisms, collision avoidance and navigation may be enabled.

Each pixel in a 3-D focal plane array (FPA) converts impinging laser light into an electronic signal whose magnitude is sampled in time and stored in memory within the pixel. Each pixel also uses a clock to time the samples being taken in response to the captured reflection of the laser light from a target pixel. Different embodiments may include a microfluidic, glass, or plastic lens, a piezoelectric actuator, a special purpose reduced instruction set computing (RISC) processor, an array of vertical cavity surface emitting lasers, an array of laser diodes, or an optically pumped solid state laser oscillator, and an FPA of light detecting elements formed from quantum dots or nanoparticles, or avalanche photodiodes (APDs), PIN diodes, or NIP diodes. The personal ladar sensor may also have a thin film resistor applied across an input and output of a transimpedance amplifier associated with each unit cell of a readout integrated circuit. The personal ladar sensor may also make use of a matched filter incorporating a parametric analog correlator, and may use chirped transmissions or multi-pulse transmission codes such as Barker codes, to deal with multipath reflections from objects or features in the field of view of the personal ladar sensor, and to produce processing gains. The personal ladar sensor may also make use of pulsed CW transmissions and heterodyne detection to enhance range performance. The personal ladar sensor is well adapted by a variety of innovative features and structures to be integrated into a cell phone, laptop or tablet computer, handheld camera, helmet, headgear, or other wearable device.

The personal ladar sensor is specifically adapted to a lightweight, low volume, low cost design, which provides new capabilities when applied to a variety of personal electronic devices. The personal ladar sensor in a first embodiment is capable of working in a flash mode as described above, or in a multi-pulse mode, or in a pulsed continuous-wave mode as the situation dictates.

The first embodiment of the personal ladar sensor includes a micro-fluidic receiving lens adaptable in shape and position through miniature piezoelectric actuators. An array of vertical cavity surface emitting lasers provides pulsed illuminating energy to a scene in the field of view at an eye-safe wavelength. The first embodiment provides a 128×128 array of light detecting elements situated on a single semiconducting substrate which is stacked atop a readout integrated circuit using a hybrid assembly method. In other embodiments of the design, M×N focal plane arrays of light detecting elements with M and N having values from 2 to 1024 and greater are anticipated.

The compact design using adaptive optics and highly efficient surface emitting semiconductor lasers, creates an opportunity to incorporate 3-D ladar imaging capability into a variety of personal electronic devices, including cellphones, cameras, portable computers, and a range of headgear. Other applications can be envisioned for such a compact and cost effective design as is described herein in the preferred and alternative embodiments, and a more exhaustive list is presented in succeeding paragraphs. Creative use of laser modulation, including spread spectrum techniques, and the use of digital representations of returned pulse shapes, allow for digital processing gains which further enable the range performance of the personal ladar devices described herein. Sequential frame processing is also enabled by the digital processors described which also produce enhanced resolution of static features or tracked objects.

A first embodiment of the personal ladar sensor, is depicted in block diagram form in FIG. 1. A system control processor 1 controls the functions of the major components of the personal ladar sensor. Control processor 1 connects to pulsed laser transmitter 2 through bidirectional electrical connections with logic, analog to digital (A/D) and digital to analog (D/A) converters (described in greater detail subsequently with respect to FIG. 9A) which transfer commands from system controller 1 to pulsed laser transmitter 2 and return monitoring signals from pulsed laser transmitter 2 to the system controller 1. A light sensitive diode detector (Flash Detector) 2a is placed at the back facet of the laser so as to intercept a portion of the laser light pulse produced by the pulsed laser transmitter 2. An optical sample of the outbound laser pulse taken from the front facet of pulsed laser transmitter 2 is routed to a corner of the detector array 5 as an automatic range correction (ARC) signal, typically over a fiber optic cable. The pulsed laser transmitter 2 may be a solid-state laser, monoblock laser, semiconductor laser, fiber laser, or an array of semiconductor lasers. It may also employ more than one individual laser to increase the data rate. In an example embodiment, pulsed laser transmitter 2 is an array of vertical cavity surface emitting lasers (VCSELs). In an alternative embodiment, pulsed laser transmitter 2 is a disc shaped solid state laser of erbium doped phosphate glass pumped by 976 nanometer semiconductor laser light.

In operation, the system controller 1 initiates a laser illuminating pulse by sending a logic command or modulation signal to pulsed laser transmitter 2, which responds by transmitting an intense pulse of laser light through transmit optics 3. In the case of a solid state laser based on erbium glass, neodymium-YAG, or other solid-state gain medium, a simple bi-level logic command may start the pump laser diodes emitting into the gain medium for a period of time which will eventually result in a single flash of the pulsed laser transmitter 2. In the case of a semiconductor laser which is electronically pumped, and may be modulated instantaneously by modulation of the current signal injected into the laser diode, a modulation signal of a more general nature is possible, and may be used to great effect as is illustrated in the discussions with respect to FIGS. 6A-C and FIGS. 8A-J in particular. The modulation signal may be a flat-topped square or trapezoidal pulse, or a Gaussian pulse, or a sequence of pulses. The modulation signal may also be a sinewave, gated or pulsed sinewave, chirped sinewave, or a frequency modulated sinewave, or an amplitude modulated sinewave, or a pulse width modulated series of pulses. The modulation signal is typically stored in system memory 21 as a lookup table of digital memory words representative of analog values, which lookup table is read out in sequence by control processor 1 and converted to analog values by an onboard digital-to-analog (D/A) converter (as discussed with respect to FIG. 9A), and passed to the pulsed laser transmitter driver circuit. The combination of a lookup table stored in memory and a D/A converter, along with the necessary logic circuits, clocks, and timers resident on control processor 1, together comprise an arbitrary waveform generator (AWG) circuit block. The AWG circuit block may alternatively be embedded within a laser driver 55 (see FIG. 3) as a part of pulsed laser transmitter 2. In an alternative embodiment, a pulse width mode (PWM) control output is provided by system controller 1, which performs the same function as the AWG of the first preferred embodiment in a slightly different manner. The advantage of a PWM control output is in the simplicity afforded to the design of the RISC processor which may be used as system controller 1. PWM control outputs are typically fully saturated digital outputs which vary only in duty cycle or pulse width. The basic pulse rate may be as high as 20 MHz-100 MHz, but filtering or integration at the control input to the pulsed laser transmitter 2 may have a lowpass filtering effect with a 3 dB corner frequency as low as 0.1-10 MHz. The use of a PWM output instead of a D/A structure means the RISC processor defined in FIGS. 9A & 9B may be formed in a fully digital process, instead of a mixed analog/digital integrated circuit process, and at a much lower cost. Of course, the A/D converter option shown in FIG. 9A would have to be eliminated from the chip described in FIG. 9A, and either the analog/digital feedback eliminated entirely, or the A/D converter realized in a separate, special purpose chip. Transmit optics 3 diffuses the high intensity spot produced by pulsed laser transmitter 2 substantially uniformly over the desired field of view to be imaged by the personal ladar sensor as can be seen in FIG. 2. An optical sample of the transmitted laser pulse (termed an ARC signal) is also sent to the detector array 5 via optical fiber. A few pixels in a corner of detector array 5 are illuminated with the ARC (Automatic Range Correction) signal, which establishes a zero time reference for the timing circuits in the readout integrated circuit (ROIC) 6. Each unit cell of the readout integrated circuit 6 has an associated timing circuit which is started counting by an electrical pulse derived from the ARC signal. Alternatively, the flash detector signal may be used as a zero reference in a second timing mode. Though the ARC signal neatly removes some of the variable delays associated with transit time through the detector array 5, additional cost and complexity is the result. Given digital representations of the image frames, the same task may be handled in software/firmware by a capable embedded processor. When some portion of the transmitted laser pulse is reflected from a feature in the scene in the field of view of the personal ladar sensor, it may be reflected onto an individual detector element of the detector array 5. This reflected laser light optical signal is then detected by the affected detector element and converted into an electrical current pulse which is then amplified by an associated unit cell electrical circuit of the readout integrated circuit 6, and the time of flight measured. Thus, the range to each reflective feature in the scene in the field of view is measurable by the personal ladar sensor. The detector array 5 and readout integrated circuit 6 may be an M×N or N×N large array. Transmit optics 3 consisting of a spherical lens, cylindrical lens, holographic diffuser, diffractive grating array, or microlens array, condition the output beam of the pulsed laser transmitter 2 into a proper conical, elliptical, or rectangular shaped beam for illuminating a central section of a scene or objects in front of the personal ladar platform as can be seen in FIG. 2.

Continuing with FIG. 1, receive optics 4 consisting of a convex lens, spherical lens, cylindrical lens or diffractive grating array captures pulsed laser light reflected from a scene in the field of view of the personal ladar sensor. Receive optics 4 collect the light reflected from the scene and focus the collected light on the detector array 5. Traditionally, detector array 5 has been formed on an indium phosphide semiconducting substrate with a set of cathode contacts exposed to the light and a set of anode contacts electrically connected to the supporting readout integrated circuit 6 through a number of indium bumps deposited on the detector array 5. The cathode contacts of the individual detectors of detector array 5 would then be connected to a high voltage detector bias grid on the illuminated side of the array. Each anode contact of the detector elements of detector array 5 is thus independently connected to an input of a unit cell electronic circuit of readout integrated circuit 6. This traditional hybrid assembly of detector array 5 and readout integrated circuit 6 may still be used, but a new technology may reduce size, complexity and cost. In the new preferred method, the elements of detector array 5 may be formed atop readout integrated circuit 6, with each detector element positioned above a corresponding unit cell electronic circuit, through the use of quantum response technology. Several quantum response detector structures are anticipated. A slurry made up of epoxy based inks and quantum dots may be applied as a paste using thick film printing techniques such as silk screen or stencil masks. The epoxy can be cured, creating a quantum dot solid with tunable light detecting properties. A quantity of quantum dots with sensitivity to the 1.55 micron wavelength light of the preferred embodiment may be formed using colloidal chemistry under carefully controlled conditions as discussed in the references. This quantum dot detector technology will be discussed in greater detail with respect to FIG. 7. It is also possible that the detector technology may be grown or formed in situ within the unit cell on the silicon ROIC, such as a germanium detector grown on silicon or as in the case of a detector which could be transferred directly from a detector wafer, such as APDs transferred from an indium phosphide wafer. Techniques which create porosity using lasers, ion implants, or chemical surface treatment may be used to create quantum dots and/or engineered nanostructures which respond at a selected wavelength or range of wavelengths. Readout integrated circuit 6 comprises a rectangular array of unit cell electrical circuits, each unit cell with the capability of amplifying a low level photocurrent received from an optoelectronic detector element of detector array 5, sampling the amplifier output, and detecting the presence of an electrical pulse in the unit cell amplifier output associated with a light pulse reflected from the scene and intercepted by the detector element of detector array 5 connected to the unit cell electrical input. The detector array 5 may be almost purely resistive, with the resistance modulated by an incident light signal at the design wavelength. The detector array 5 may also be a P-on-N design or N-on-P design with the dominant carrier being holes or electrons respectively; the detector array 5 may include photoelectron amplification; the corresponding ROIC would potentially have the polarity of the bias voltages and amplifier inputs adjusted accordingly.

The hybrid assembly of detector array 5 and readout integrated circuit 6 of the example embodiment is mounted to a circuit substrate as shown in FIG. 3. Alternatively, a fully integrated detector array 5 and readout integrated circuit 6 is mounted to the circuit substrate of FIG. 3. The circuit assembly provides support circuitry which supplies conditioned power, a reference clock signal, calibration constants, and selection inputs for the readout column and row, among other support functions, while receiving and registering range and intensity outputs from the readout integrated circuit 6 for the individual elements of the detector array 5. Many of these support circuits are implemented in RISC processors which reside on the same circuit substrate. The circuit substrate and associated support circuitry functions will be described in greater detail in the discussion of FIG. 3. A detector bias control circuit 7 applies a time varying detector bias to the detector array 5 which provides optimum detector bias levels to reduce the hazards of saturation in the near field of view of detector array 5, while maximizing the potential for detection of distant objects in the field of view of detector array 5. The contour of the time varying detector bias supplied by detector bias control circuit 7 is formulated by control processor 1 based on inputs from the data reduction processor 11, indicating the reflectivity and distance of objects or points in the scene in the field of view of the detector array 5.

Control processor 1 also provides several clock and timing signals from a timing core 1*a* to readout integrated circuit 6, data reduction processor 11, analog-to-digital converters 10, object tracking processor 17, and system memories 1-3 (21, 12, & 16). Control processor 1 relies on a temperature stabilized frequency reference 8 to generate a variety of clocks and timing signals. Temperature stabilized frequency reference 8 may be a temperature compensated crystal oscillator (TCXO), dielectric resonator oscillator (DRO), or surface acoustic wave device (SAW). A timing core resident on control processor 1 may include a high frequency tunable oscillator, programmable prescaler dividers, phase comparators, and error amplifiers. System memories 1-3 are each associated with a digital processor, and may include ROM, EPROM, or other non-volatile memory such as flash. Each system memory 1-3 may also include a volatile memory such as SRAM or DRAM, and both volatile and non volatile memory may be integrated into each of the processors. The functioning of system memories 1-3 (21, 12, & 16) and the three digital processors will be discussed in greater detail with respect to FIGS. 9A-9B. Typically, data reduction processor 11 and control processor 1 are of the same type, a reduced instruction set (RISC) digital processor with hardware encoded integer and floating point arithmetic units. Object tracking processor 17 may also be of the same type as RISC processors 1 and 11, but may in some cases be a processor with greater capability, suitable for highly complex graphical processing. Object tracking processor 17 may have in addition to hardware encoded integer and floating point arithmetic units, a number of hardware encoded matrix arithmetic functions, including but not limited to; matrix determinant, matrix multiplication, and matrix inversion. Analog outputs 9 of the readout integrated circuit 6 representing range and intensity of the laser pulse energy reflecting from the scene are converted from analog to digital format by dual analog to digital (A/D) converters 10. Two A/D converters are needed because there are two analog outputs on the readout integrated circuit 6, which are interleaved. Interleaving the outputs means one of the outputs ("A") reads out the odd numbered lines of the detector array 5, and the other output ("B") reads out the even numbered lines of the detector array 5. The digital outputs 22 of the A/D converters 10 connect to the inputs of the data reduction processor 11. The digital outputs 22 are typically 10 or 12 bit digital representations of the raw range and intensity measured at each pixel of the detector array 5, but other representations with greater or fewer bits may be used, depending on the application. The rate of the digital outputs depends upon the frame rate and number of pixels in the array.

In operation, the control processor 1 controls readout integrated circuit 6, A/D converters 10, data reduction processor 11 and object tracking processor 17 through a bidirectional control bus 13 which allows for the master, control processor 1 to pass commands on a priority basis to the dependent peripheral functions; readout IC 6, A/D converters 10, Data reduction processor 11, and object tracking processor 17. Bidirectional control bus 13 also serves to return status and process parameter data to control processor 1 from readout IC 6, A/D converters 10, Data reduction processor 11, and object tracking processor 17. Data reduction processor 11 corrects and adjusts the raw digitized data received from A/D converters 10, and outputs a full image frame via unidirectional data bus 14 to frame memory 15, which is a dual port memory having a capacity of holding hundreds, or in some cases, thousands of frames. Frame memory 15 provides outputs through unidirectional bus 15A to object tracking processor 17 and control processor 1. Object tracking processor 17 has a system memory 16 with sufficient memory capacity to hold multiple frames of image data, allowing for multi-frame synthesis processes, including video compression, single frame or multi-frame resolution enhancement, statistical processing, and object identification and tracking. The outputs of object tracking processor 17 are transmitted through unidirectional data bus 18 either directly to an end user (not shown) or to control processor 1 which conditions the multi-frame synthesized data for transmission to an end user via bidirectional communications connections 19. Bidirectional connections 19 may be high speed serial connections such as Ethernet, USB or Fibre Channel, or may also be parallel high speed connections such as Infiniband, etc., or may be a combination of high speed serial and parallel connections, without limitation to those listed here. Bidirectional connections 19 also serve to upload information to control processor 1, including program updates for data reduction processor 11, object tracking processor 17, and global position reference data, as well as application specific control parameters for the remainder of the personal ladar sensor functional blocks. Inertial reference 20 is utilized in addition to external position references by control processor 1, which passes position and inertial reference data to data reduction processor 11 for adjustment of range and intensity data, and to object tracking processor 17 for utilization in multi-frame data synthesis processes.

FIGS. 2A-2D shows four typical personal applications in which the personal ladar sensor (generally designated 200) of the present design may be mounted. In FIG. 2A, headgear comprising a bicycle helmet or skating helmet 23 is shown which might also be a pilot or driver's helmet, or a fireman or miner's hat. Optical aperture 24 serves to transmit the illuminating pulse of eye-safe laser light in an elliptical beam pattern 25. The reflected light returning to the personal ladar sensor from features in the field of view of the detector array 5 (of FIG. 1) may pass through the same optical aperture 24 or through a separate optical path. The operator 23A receives visual feedback from the personal ladar sensor through the glasses or visor 35B which may also be a headup projection type display or an LCD screen. The operator 23A may also receive audio feedback from the personal ladar sensor through audio feedback device 35A shown as a headphone which covers the ear. Audio feedback device 35A may also be a hearing aid style device worn within the cartilaginous part of the ear or may be a miniature device worn within the ear canal, or may be a cochlear implant style device. The operator may be blind, or escaping from a smoke filled environment for example. In FIG. 2B, a personal handheld camera is shown with an optical aperture 28 which serves to transmit pulsed laser light in a rectangular illumination pattern 26. A button 27 initiates the flash of the laser pulse through optical aperture 28 at the preferred eye-safe wavelength of 1.55 microns. The camera may also be triggered electronically through a cable (not shown), or may run for a number of frames for each trigger event, or may run continuously if the button 27 is held down, or if the camera is repeatedly retriggered electronically. The camera body 29 may also house a boresighted visible light optical receiving aperture 30 aligned with the far field illumination pattern 26. In the drawing of FIG. 2B, the personal ladar sensor 200 is shown mounted atop the camera similar to a standard flash unit, but the personal ladar sensor also may use the same optical aperture 30 as the visible light sensing camera. In FIG. 2C a portable computer 36 is shown with a keyboard or keypad 37, an optical aperture 39, a graphical display 40, and a circular far field illuminating pattern 38. Portable computer 36 may also be a tablet computer, notebook computer, personal digital assistant, or other portable computing device. The optical aperture 39 may, in some designs be used for both transmitting an illuminating pulsed laser light and receiving laser light reflected from features in the field of view. The portable computer 36 may also have a standard visible light still or video camera. The personal ladar sensor may also be a modular add-on device 39A which may be plugged into a communications or peripheral interface port such as an Ethernet port or USB port on the portable computer 36. Portable computer 36 has a number of connector receptacles 36C dedicated to receiving mating connector plugs from USB, Ethernet, RJ-45, or other interface connection, and which may alternatively be used to attach a modular ladar sensor 39A as described herein. The personal ladar sensor module 39A is at the distal end of cable 36B and has a conical field of view 38A in the example. At the proximal end of cable 36B is plug 36A which may connect to a source of power within computer 36 and receives data and control commands from computer 36 through the USB peripheral port in the example. 3-D image data from the personal ladar sensor module 39A is returned to portable computer 36 through cable 36B and plug 36A to the USB peripheral port 36C in the example. The cable 36B may contain strength members, and electromagnetic shielding layers. The cable 36B may also be comprised of coaxial transmission lines, straight wire, twisted pair, twin-axial, tri-axial, or other electrical connecting structures, and may also have fiber optic transmission lines. Plug 36A and personal ladar sensor 39A may each have a fiber optic transmitter, or receiver, or both transmitter and receiver to interface with a fiber optic transmission line within cable 36B. In an alternative embodiment, the cable attachment 36B is eliminated from the modular personal ladar sensor 39A, and the plug 36A is integrated into the body of the modular personal ladar sensor 39A, allowing for direct connection to the portable computer 36. The field of view 38A may be elliptical, rectangular, or any other desired shape without changing the nature or benefits of the instant invention. The communications or peripheral port on portable computer 36 may be a parallel port, printer port, serial communications port, or network communications port without altering the attendant advantages of the design. Shown in FIG. 2D is a cellphone 34 with an optical aperture 32 which passes the pulsed laser light which creates the circular illuminating pattern 31. A button 33 allows the operator to talk over his cellphone wireless connection while at the same time taking 3D pictures from the same cellphone with single frame, multi frame, and video trigger modes. Display 35 lets the operator monitor the focus, lighting, and composition of the pictures. The optical aperture may also serve as a receiving aperture for pulsed laser light reflected from features in the field of view of the personal ladar sensor 200. The cellphone may be any handheld personal communications device including i-phones, e-phones, etc., and may have a visible light camera installed as well.

FIG. 3 shows a side view of a number of the construction techniques used in the personal ladar sensor of the present invention. The printed circuit substrate 41 may be an epoxy-glass laminate, ceramic, or glass. Multiple conductive layers may be formed by standard techniques of printed circuit board etch/laminate process, or by thick film additive process, or by thin film circuit process. In the preferred embodiment, printed circuit substrate 41 is a ceramic core of alumina or aluminum nitride, with alternating insulating and conductive layers added by means of thick film screen/stencil printing and firing. A number of integrated circuits are then attached to printed circuit substrate 41 by flip chip soldering or by epoxy die attach and wirebonding. In the preferred embodiment, control processor 1, data reduction processor 11, object tracking processor 17, and laser driver 55 are formed with metallic bumps on the circuit side, flipped and bonded to printed circuit substrate 41, in a method typically referred to as flip-chip bonding. Laser driver circuit 55 may be a simple high current saturated switch in the form of a single MOSFET, or MOSFET array, or may be a more sophisticated circuit constituting the elements of an arbitrary waveform generator (AWG) and power amplifier. Laser driver 55 may have an onboard lookup table stored in non-volatile or volatile memory, and a D/A converter to convert a sequence of the digital values in the lookup table into analog values, and a counter or sequence controller, together creating a highly adaptable analog waveform suitable for application to a laser diode. An array of vertical cavity surface emitting lasers (VCSELs) 54 is then attached to the top side of printed circuit substrate 41, along with a hybrid assembly including detector array 5 and readout integrated circuit 6. Wirebonded electrical connections are then made as required. Next, two optical subassemblies are attached to printed circuit substrate 41, one for the transmit side, and a second one for the receive side. The transmit optical subassembly, a rectangular tub with sidewalls 52 and a lens element 53, is attached to printed circuit substrate 41 so as to cover VCSEL array 54, and provide protection against environment and contamination. The transmit optical subassembly prior to mounting on printed circuit substrate 41 resembles an open box, with one face of the box dominated by an optically transmissive window or lens element 53. The receive optical subassembly is shown at the left side of FIG. 3, and includes a rectangular tub with sidewalls 42 and bottom face 43 with optically transmissive window/lens 44, microfluidic lens 45, piezoelectric bellows actuators 46 & 50, actuator plates 47 and 49, and mechanical stop 51. A compression region 48 at the periphery of microfluidic lens 45, is sandwiched between actuator plates 47 and 49. The microfluidic lens 45 is an elastic polymer envelope filled with an inert, optically transmissive fluid such as water, fluorinert, or optical grade silicone. The receive optical subassembly is formed in the following manner: first, sidewalls 42 are formed in a rectangular shape by stamping or deep drawing, second, mechanical stop 51 is welded to sidewalls 42, third, piezoelectric bellows 50 are inserted, followed by actuator plate 49 and microfluidic lens 45, then top actuator plate 47 and piezoelectric bellows 46. Finally, the bottom face 43 with integral optically transmissive window/lens 44 is seam welded in place to complete the receive optical subassembly. The receive optical subassembly and the transmit optical subassembly may be assembled to the printed circuit substrate 41 at the same time, or sequentially by the preferred method of solder bonding. Alternatively, the receive optical subassembly and transmit optical subassembly may be bonded in place by a low temperature glass or epoxy. Sidewalls 42 and 52 of the receive and transmit optical subassemblies may have flat mating surfaces as shown, or may have tangs, tines, or hooks protruding which positively engage with printed circuit substrate 41. In operation, the shape and position of microfluidic lens 45 may be adjusted by means of the piezoelectric bellows actuators 46 and 50 compressing the compression region 48, and by moving the center position of microfluidic lens 45 up or down relative to the surface of focal plane detector array 5. In this manner, a 2:1 optical zoom lens may be effected with a single lens element, and focus maintained at the surface of focal plane detector array 5, using a minimum number of inexpensive optical and mechanical components. In an alternative embodiment, microfluidic lens 45 is replaced with a fixed focal length lens of glass, polymer, or other suitable optically transmissive material.

FIGS. 4A-4G show the details of elements of the piezoelectric actuators 46 and 50 of the receive optical subassembly of FIG. 3, and explains their operation graphically. Each bellows actuator is formed from a stack of four piezoelectric sheets 401, 402, 403, 404 as can be seen in FIG. 4F each of which has been polarized during the manufacturing process to have a permanent positive charge on one side of the film, and a corresponding negative charge on the opposite face as shown in FIG. 4A. In the example embodiment, each sheet is polyvinylidene fluoride, a piezoelectric polymer, approximately 1 mil (0.001") thick. Other piezoelectric materials and sheet thicknesses may be used without changing the nature or benefits of the piezoelectric actuator as described herein. In a second step, metal electrodes are applied to both opposing faces of the piezoelectric sheet as shown in FIG. 4B. FIG. 4B also shows the effect of an external voltage bias provided by source 405 which produces an electric field E with a polarity opposite the zero bias polarity P, of the film. With the electric field E directed opposite P as shown in FIG. 4B, the sheet of material will be compressively strained, and will shrink radially if unconstrained, as shown by the block style arrows in the drawing. FIG. 4C shows the effects of an electric field E imposed in the same direction as the zero bias polarity, P. With the electric field E in the same direction as P, the sheet of material is in tension, and will expand if unconstrained. In FIG. 4D two sheets of the piezoelectric material (sheets 401 and 402 as examples) have been bonded together, with the center electrodes connected to a negative potential, and the exterior electrodes connected to a common, or ground potential. This bias voltage arrangement produces electric fields E in the two sheets directed towards the center electrode of the sandwich, causing expansion in the upper sheet and compression in the lower sheet. Since the two sheets are bonded together, a bending moment is realized on the assembly which causes it to deflect upwards. FIG. 4E shows the results of a reversal of the external voltage polarity on the same assembly, so an electric field E is directed radially outward from the center electrode of the sandwich. This bias arrangement produces compression in the upper sheet and expansion in the lower sheet, resulting in a deflection downward. The simple assembly of FIGS. 4D and 4E may be used in isolation as an actuator, but an actuator with greater displacement is desired. The bellows actuator (46, 50) of FIG. 4F is formed by stacking two of the subassemblies of FIGS. 4D and 4E together and bonding them together only at the edges. In this configuration, one polarity of external voltage causes a flattening of the bellows, and the opposite polarity voltage "inflates" the bellows, producing vertical forces as shown in the drawing, depending only on the polarity and magnitude of the voltage applied, and the geometry of the bellows (46, 50). FIG. 4G gives additional detail of the shape of actuator plates 47, 49, which are shaped to distribute the forces created by piezoelectric bellows actuators 46 & 50 evenly on the compression region 48 of microfluidic lens 45. The actuator plates 47, 49 of the example embodiment are generally in the shape of a washer with a rectangular outer profile and a circular inner profile, though the shape of the inner profile may be more elliptical or rectangular in alternative embodiments, and the outer profile may be more circular or elliptical in yet other alternative embodiments.

FIGS. 5A-5G illustrate a sequence of steps involved in creating a vertical cavity surface emitting laser (VCSEL) at the desired eye-safe wavelength of 1.55 microns. A VCSEL is desirable for the personal ladar application because it is of the highest efficiency available, may be rapidly modulated, is compact and environmentally robust, and is capable of operating over a wide temperature range. In addition to these benefits, it is capable of producing a single mode output with a circular beam profile. Many VCSEL designs for 1.55 micron wavelength output have been described in the art, but none has made the transition to manufacturing due to constraints on the materials. The top surface of most VCSEL designs incorporate a Bragg reflector to reflect light at a selected wavelength back into the gain medium, which is a semiconductor diode. At the 1.55 micron wavelength, the diode material is typically indium phosphide. To construct a Bragg reflector, alternating layers of higher index and lower index of refraction are created, typically one quarter of a wavelength in thickness. This alternating structure relies on the contrast ratio of the alternating layers to produce the desired reflection. To create the contrast ratio in semiconductor films such as indium phosphide, the material is often doped with arsenic or gallium. However, doping indium phosphide with arsenic or gallium also produces strain in the crystal lattice, creating defects, and rapidly reducing reliability. To realize sufficient contrast ratio in indium phosphide material systems, doping levels must be raised to a point where strain renders the device unusable. Excess strain can result in a number of crystallographic defects, including microcracking, dislocations, and voids, all of which combine to destroy the semi-insulating properties of the semiconductor, rendering a VCSEL made in this manner unusable. Most VCSEL designs are seeking a structure which can be completed in a MOCVD chamber using typical indium phosphide processing parameters in order to be able to scale to production with ease and enable a very low cost production model. As a result, the search for the elusive formula for a 1.55 micron VCSEL goes on now for more than a decade. Therefore, there exists an opportunity for a hybrid approach to VCSEL production which might produce the very desirable properties of the indium phosphide 1.55 micron VCSEL, albeit using a hybrid process which might not scale to high production volume quite so efficiently. The personal ladar application described herein also may support a somewhat higher cost model for a VCSEL with the appropriate properties, at least in the early stages of market development. FIG. 5A shows a beginning phase of the hybrid process VCSEL array of the present invention. Substrate 64 is typically a high quality n-type indium phosphide wafer, between 250-400 microns thick. Grown epitaxially atop substrate 64 is the VCSEL gain region 56, usually a multiple quantum well structure (MQW) as commonly found in the literature. FIG. 5B shows a surface metallization 57 which acts both as a backside mirror for the VCSEL, and an anode contact for the p-type top layer of the MQW structure. Metallization 57 is typically a sequence of titanium/platinum/gold, but may be altered without changing the nature or usefulness of the invention. FIG. 5C shows the introduction of an aluminum nitride substrate 58 with a metalized surface which is now bonded electrically and mechanically to the multiple anode contacts of the in-process hybrid VCSEL array (64, 56, 57). FIG. 5D shows the indium phosphide substrate thinned 59 to approximately 25-75 microns (not shown to scale) by a chemical-mechanical polishing process known as CMP. The aluminum nitride substrate 58 serves as a very stiff backing material and polishing puck for the thinning process so the thinned substrate 59 will not be damaged in process or by subsequent handling. Thicknesses below 25 micron may eventually be supported, with 15 microns being possible. The substrate 64 must be thinned, because at the 1.55 micron wavelength desired, the indium phosphide semiconductor material is absorbing and optically lossy. Therefore, the thinner substrate 59 can be processed, the better, as higher efficiency is the result. FIG. 5E shows metal cathode contacts 60 applied in a ring around the active region 61 of the VCSEL structure. The metallization scheme is typically titanium/platinum/gold, though other metallization schemes may be used with similar useful effects. The final step in forming the hybrid process VCSEL array is the formation of Bragg reflector structure 62 by physical vapor deposition as shown in FIG. 5F. Many different materials may be used to form the alternating index of refraction layers of the Bragg reflector structure, though compounds of silicon dioxide, silicon nitride, and indium antimonide are preferred. Physical vapor deposition involves the evaporation of the selected dielectric material in a crucible, together with the target substrate 58 in a high vacuum, and with substrate 58 oriented so as to intercept and receive the evaporated dielectric material. Other methods of depositing the Bragg reflector such as sputtering, chemical-vapor-deposition (CVD), or other suitable process may be used without changing the nature or benefits of the instant invention. The substrate 58 now hosts a wafer-sized array of hybrid process VCSELs which may be singulated or reduced to a number of multi-VCSEL arrays. The method for creating single VCSELs or multi-VCSEL arrays is shown in FIG. 5G wherein a diamond coated saw blade 63 slices through the remainder of thinned substrate 59, and may also slice through AlN substrate 58, depending on the size and shape of the hybrid VCSEL array desired.

Figure 8A:
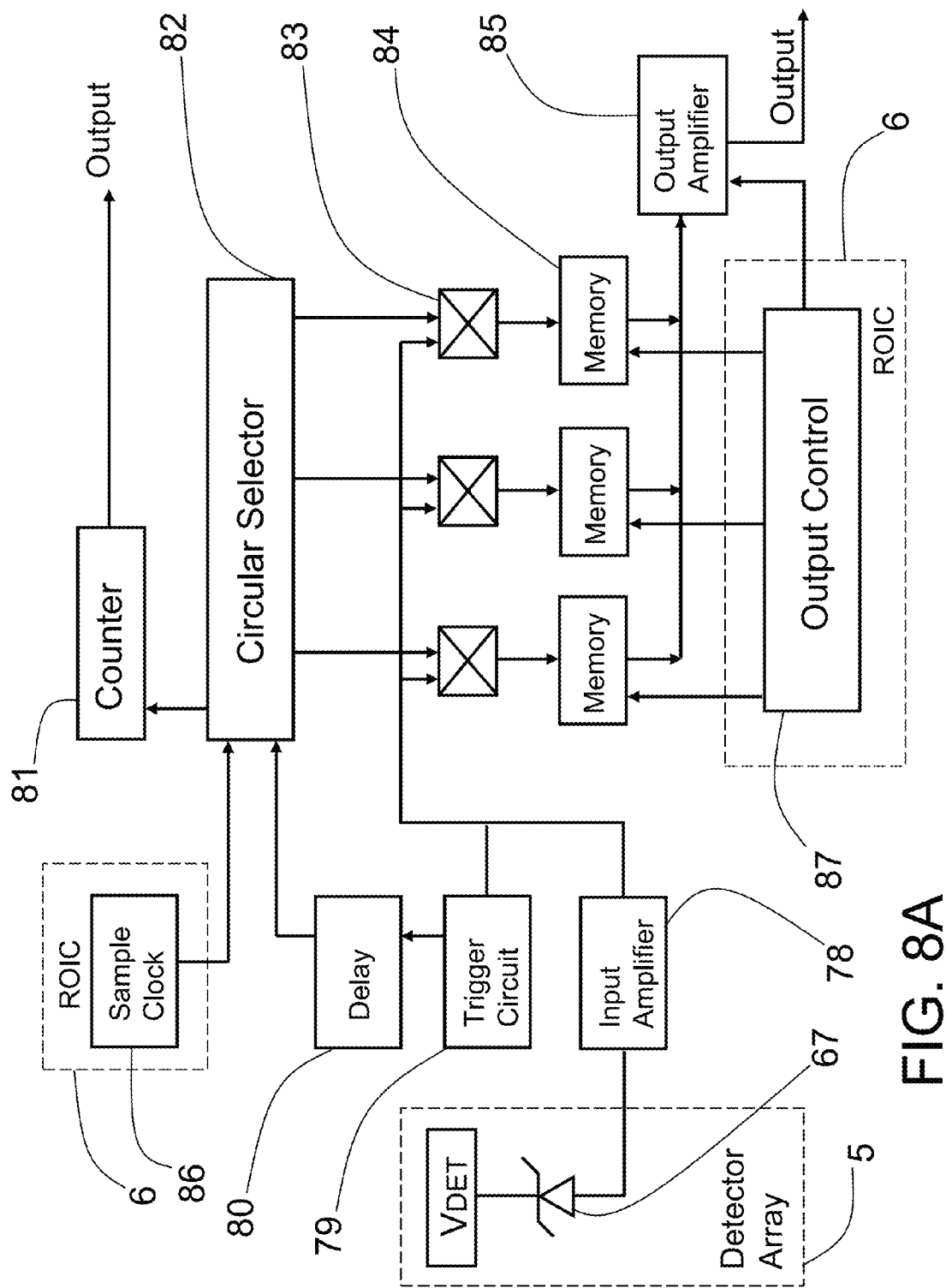
FIG. 8A shows the unit cell electronics of a readout integrated circuit suitable for amplifying and detecting reflections of the single pulse laser transmissions of the type shown in FIG. 6A.
Figure 8B:
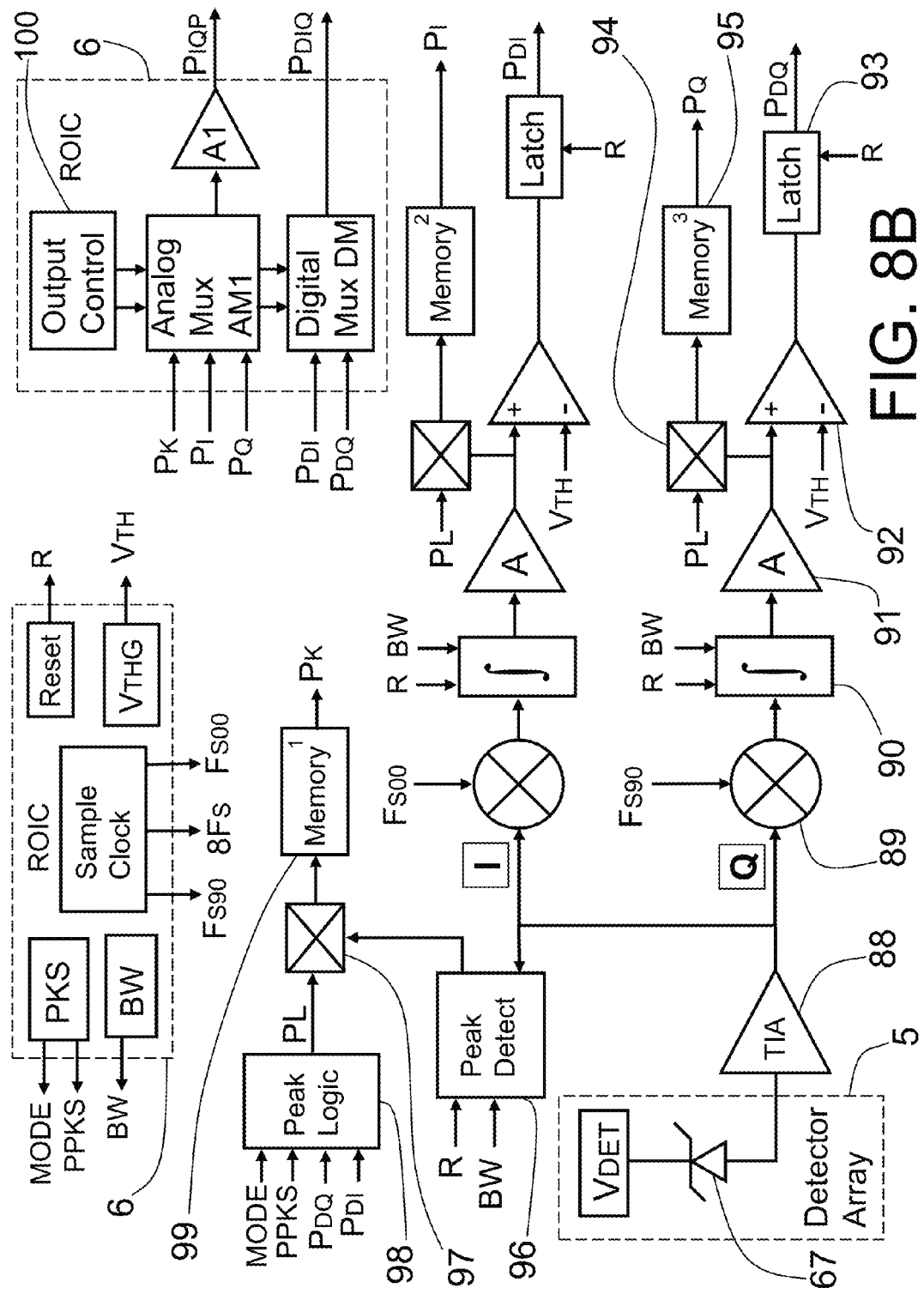
FIG. 8B shows the unit cell electronics of a readout integrated circuit suitable for amplifying and detecting reflections of the pulsed sinewave laser transmissions of the type shown in FIG. 6B.
Figure 8C:
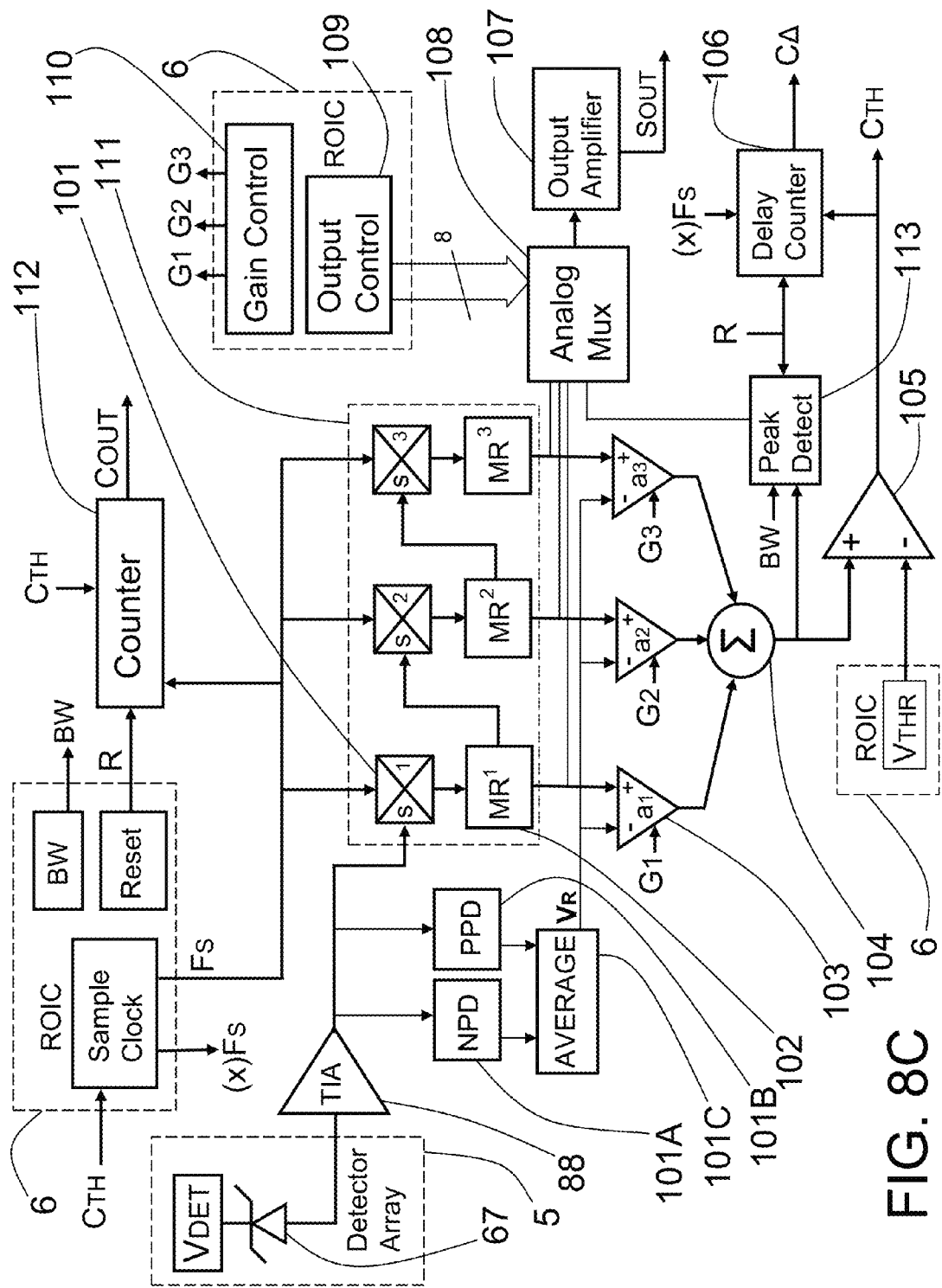
FIG. 8C shows the unit cell electronics of a readout integrated circuit suitable for amplifying and detecting reflections of the chirped sinewave pulse laser transmissions of the type shown in FIG. 6C.

FIG. 6A illustrates a typical transmitted laser pulse 602. This pulse is described by the Gaussian mathematical relationship between transmitted optical power, P, and time, t. Shown in FIG. 6B is the resulting sampled waveform 604 after the receiver section of the personal ladar sensor has processed the reflected pulse. The receive section of the personal ladar sensor would include receive optics 4, detector array 5, and readout integrated circuit 6. The samples shown in FIG. 6B are held in the analog sampling circuits of the readout integrated circuit 6. The use of a semiconducting laser allows for tailoring of the drive current to the VCSEL laser (54 in FIG. 3) of the example embodiment, or any diode laser, so as to produce the desired Gaussian optical pulse shape with only slight deviations. The VCSEL response time is in the sub-nanosecond regime, and the typical pulse width might be 3-20 nanoseconds at the half power points. In the example embodiment, the VCSEL laser driver 55 is itself driven by a digital-to-analog converter which has a conversion rate of 200-300 MHz, so any deviations in the output pulse shape from the Gaussian ideal may be compensated for in the lookup table in system memory 21 associated with control processor 1, which serves as the digital reference for the drive current waveform supplied to the laser driver 55 by the D/A converter. The Gaussian single pulse modulation scheme of FIGS. 6A and 6B works well at short ranges, given the limited optical power available from a VCSEL laser. The unit cell electronics depicted in FIGS. 8A and 8C are well matched to this Gaussian single pulse modulation scheme, and will be described in detail with respect to the discussion of FIGS. 8A, 8C. Depending on a number of factors, such as the size of VCSEL array 54, the reflectivity of the objects in the field of view of the personal ladar sensor, and the responsivity and excess noise of the detector array 5, the effective range of the Gaussian single pulse modulation scheme of FIG. 6A might be in the range of 10-20 meters. Without resorting to a massive VCSEL array 54, which might be expensive and might require a large discharge capacitor to supply a massive current pulse, a more thoughtful solution to extending the range of the personal ladar sensor beyond 10 meters is needed. FIG. 6G shows a table of Barker codes used in multi-pulse radar schemes which will be discussed in depth with respect to FIG. 8C.

Figures 6E, 6F:
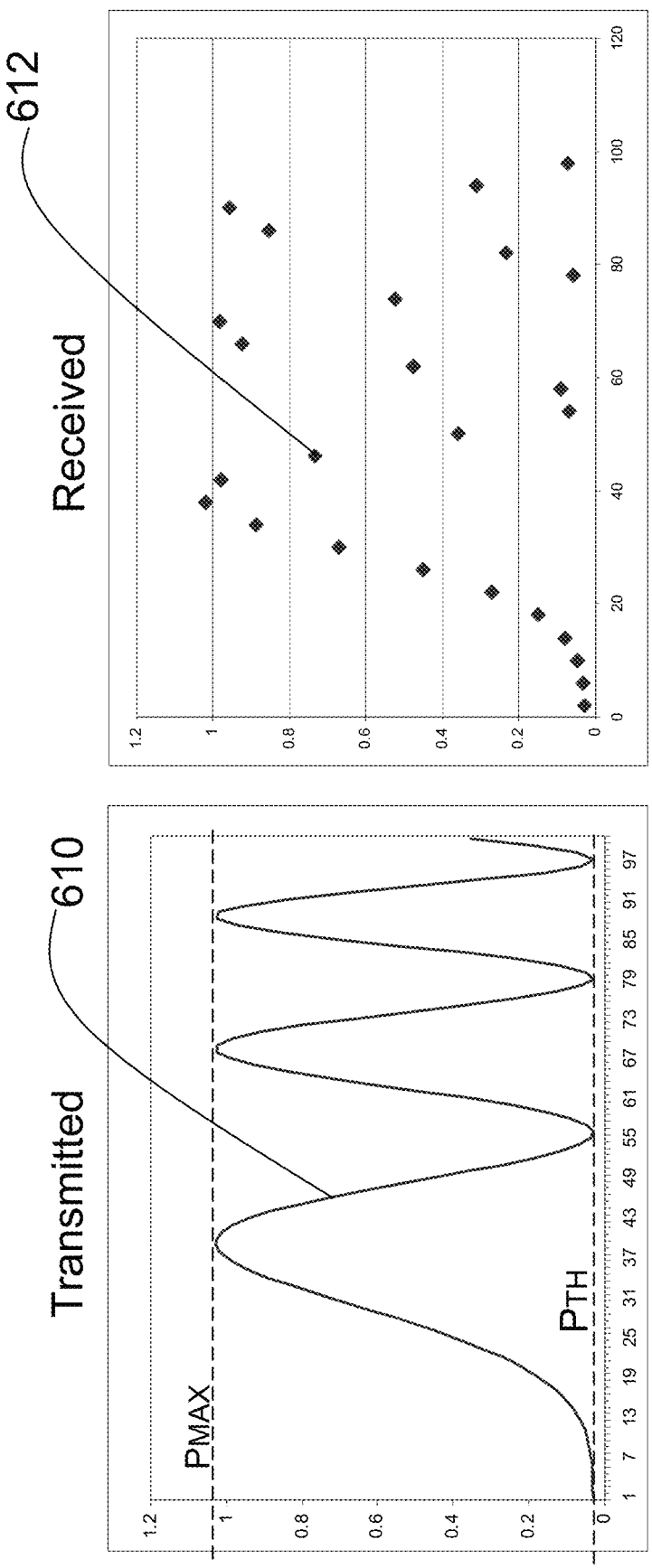
FIGS. 6E and 6F shows a chirped sinewave pulse laser transmission and the sampled results of the chirped sinewave pulse laser transmission which has been reflected from a scene in the field of view of the personal ladar.

FIGS. 6C and 6D illustrate a second method of modulating VCSEL array 54 which is designed to yield increased range capability for the personal ladar sensor, without any increase in peak transmitted laser power. FIG. 6C shows a sinewave modulated VCSEL array 54 which allows for greater energy to be reflected from a feature in a scene in the field of view of the personal ladar sensor. Each peak of the pulsed sinewave 606 in FIG. 6C will have a separate reflection from an object or feature in the scene in the field of view of the personal ladar sensor, and the receive electronics of FIG. 8B allow the ladar sensor receiver to respond to the cumulative energy from many of these reflected pulses using a minimum of circuitry. The waveform of FIG. 6C shows a laser pulse made up of only two complete sinewave cycles, but the actual number could be quite large, depending on a number of factors. FIG. 6D shows the transmitted waveform after it is received and sampled as in the unit cell circuits of FIGS. 8A, 8C as represented by waveform 608. The receiver circuitry of the unit cell electronics described in FIG. 8B is capable of synchronously detecting the cumulative energy of the returned pulse peaks, and measuring the phase of the reflected laser energy with respect to the transmitted laser sinewave modulation. This ability to integrate the energy from multiple reflected laser pulses produces a processing gain, which will extend the range of the personal ladar sensor without any increase in VCSEL array 54 peak power. The number of cycles in the pulsed sinewave modulation could be up to several thousand, depending on a number of factors. If the ladar should have a maximum range capability of 150 meters in free space, the total round trip delay from transmit to receive would be around 1 microsecond. For the phase measurement to be meaningful, the frequency of transmission must therefore be less than 1 MHz to avoid aliasing of targets at the 150 meter limit. In other words, the further the target, the lower the frequency of modulation must be for a single modulation frequency phase measurement to be meaningful. In a conventional sweep radar, the dwell time on the target is limited, so return signals beyond the maximum design range often do not appear as aliased, or "ghost" signals at a shorter apparent range. In the ladar of the instant invention, the typical mode is a staring mode, and there is no sweep of the illuminating beam or receiving antenna across the target space. Therefore, in the personal ladar sensor of the present design, responses from targets beyond the designed maximum range could produce an aliased response (one in which the phase shift is greater than $2\pi$). A method for resolving these aliased, or "ghost" images is to illuminate the target in a second or third transmission with a slightly different frequency; for example 0.99 MHz versus the 1.0 MHz in a first gated sinewave illuminating pulse. If the target image remains at the same apparent range, it is likely a real target at a range less than the design maximum range limit. If the apparent range of the target shifts at the second illuminating frequency, it is likely the image is an aliased, or "ghost" image from a target at a distance beyond the design maximum range of the personal ladar sensor. The personal ladar sensor of the instant invention makes use of a frequency agile transmitter which can rapidly tune from a first transmission frequency to a second transmission frequency, and more if necessary. The personal ladar sensor of the example embodiment makes use of a semiconductor VCSEL laser, enabling the use of shaped single pulses, shaped multiple pulses, shaped and encoded multiple pulses, gated sinewave, gated chirped sinewave, and multi-frequency gated sinewave modulation schemes. By selecting a modulation regime appropriate to the particular scene or objects to be imaged, the flexible modulation capabilities of the present design result in a minimum sized pulsed laser illuminating source with maximum performance in range and resolution. A second possible method to resolve aliased, or "ghost" images is the use of the chirped modulation shown in FIGS. 6E and 6F which will be discussed in greater detail with respect to the unit cell electronics of FIG. 8C. Another difficulty in using a pulsed sinewave modulation is the ambiguity which arises from multiple reflections of energy from within the solid angle subtended by each pixel in the detector array 5. Multiple reflections can arise from three possible scenarios; one is multipath, wherein a reflection from a feature in a scene in the field of view propagates directly back into the receive optics 4, along with a weaker copy of the reflected signal which is reflected a second time by a second reflective surface back to the receive optics 4, therefore taking a second, and longer path, with an associated increase in delay. A second difficulty for the simple sinewave modulation of FIG. 6B is the possibility of partial reflections; an example being a white wall 10 feet behind a glass window. The glass in front will produce a partial reflected pulse with lower amplitude and a shorter delay than the large amplitude reflection with higher delay produced by the white reflecting surface of the wall. These two reflections will be superimposed on the same pixel of the detector array 5. The third scenario which might produce ambiguity is the case of a distant target wherein the edge of a white building sits side-by-side with a dark grey or brown building set back 10 feet further from the personal ladar sensor. In this case each of the two vastly different reflecting surfaces might subtend one half of a pixel of detector array 5 projected through the receive optics 4, each at a different depth. This third scenario would be indistinguishable from the first and second ambiguity scenarios described above. To restate the principle, one cannot easily distinguish multiple overlapping reflections from multiple returns with different phases, if the laser illuminating source is modulated with a simple pulsed or gated sinewave. This is a well known radar principle, and is the reason a short Gaussian pulse is a favored modulation, because of the lower probability of an overlapping response from either multipath or multiple reflecting surfaces at different distances. Signal processing methods can be used to separate multipath returns as well as multiple reflections subtended by the viewing angle of the pixel in question, but an illuminating pulse with low auto-correlation sidelobes should be used to enable these signal processing techniques. Other methods for reducing the auto-correlation sidelobes of the modulation signal include chirping the sinewave modulation as shown by the waveform 610 in FIG. 6E. In FIG. 6F, the received and sampled transmit waveform 612 is shown. A second method to reduce auto-correlation of the transmit waveform is to use an encoded multi-pulse sequence, such as Barker codes to encode a series of individual pulses, like the Gaussian pulses of FIG. 6A. FIG. 6G is a table showing Barker code sequences for the 7, 11, and 13 length codes. To process the chirped sinewave modulation of FIG. 6E, the unit cell electronics described in FIG. 8C are well suited, with an analog parametric matched filter. Barker coded Gaussian pulses or other types of encoded pulse sequences are also well suited to the unit cell electronics of FIG. 8C, and will be included in the discussion of FIG. 8C.

FIGS. 7A-7D illustrate a combined detector array 5 and readout integrated circuit 6 which overcomes some of the limitations of the hybrid assembly approach discussed previously with respect to FIGS. 1 and 3. The readout integrated circuit 6 incorporates a silicon substrate 65 which has been patterned with a number of unit cell electronic circuits 66 which are shown below the surface of readout integrated circuit 6 for the purpose of clarity. In general, circuits are formed on the surface of silicon substrate 65, and dielectric insulating layers and metallic conductive layers added to interconnect the circuit elements. As the dielectric and conductive layers are added, measures are taken to planarize the surface of the readout integrated circuit 6 by depositing additional dielectric layers 68 in the gaps and around the edges of the unit cell electronic circuits. A voltage distribution grid 69 connects to all elements 67 of the detector array 5 through a series resistor 70, printed on the surface of readout integrated circuit 6. Series resistor 70 is sized so as to fuze at a current level which will protect the circuitry of unit cell electronics 66 against the potentially high voltages distributed on grid 69. Shown in FIGS. 7A and 7B is a small 4×8 array of detector elements 67, though the example embodiment is a 128×128 detector array 5. Much larger detector arrays 5 are possible using the technologies described herein, and detector arrays 5 of 288×512 detector elements 67 are being designed. In the integrated ROIC 6 and detector array 5 design approach of FIGS. 7A and 7B, the detector elements 67 are deposited directly atop the unit cell electronics 66 using one of the two approaches detailed shown in FIG. 7C or 7D. Shown in FIG. 7C is a unit cell electronic circuit 66 with two detector contacts, a cathode contact 73, and an anode contact 77. A ground connecting grid 71 is also supplied to each detector element 67 of the combined detector array 5 and ROIC 6, and is seen in profile in FIG. 7C. The cathode contact 73 of each detector element 67 of detector array 5 connects through resistor 70 to the voltage distribution grid 69. A thin dielectric insulating layer 72 separates cathode contact 73 from ground connecting grid 71, forming a parallel plate capacitor. Ground connecting grid 71 may be formed in a rectangular "picture frame" shape around the active region of each detector element 67 of detector array 5, thereby creating a significant capacitance. The combination of series resistor 70 and the decoupling capacitor formed by cathode contact 73, dielectric insulating layer 72, and ground connecting grid 71 forms an excellent low pass filter, effectively isolating detector elements 67 from the effects of transient local variations in the voltage supplied by distribution grid 69. This structure may be termed a capacitive voltage distribution grid. For example, without the capacitive voltage distribution grid, a very strong optical signal incident upon a given detector element 67 of detector array 5 could cause the voltage distribution grid to dip locally, which could create an induced negative transient in a neighboring detector element 67 which might be illuminated just above threshold. Such a negative going transient might cancel out the effect of any low level illumination of the nearest neighbor, creating an erroneous non-response in the neighboring pixel. FIG. 7C shows n-type region 74, p-type region 76, and insulating layer 75, forming a detector diode analogous to the classic p-n junction photodetector diode. The production of quantum dots tuned to a particular wavelength has been demonstrated using among other techniques, colloidal chemistry, and references are provided to explain the methodology. These references are lengthy, and need not be reproduced in this text, and are incorporated herein by reference. Using a quantity of these quantum dots which have been produced using any one of the referenced methods and tuned to the eye-safe wavelength of 1.55 microns, an epoxy based ink is prepared with n-type properties, and a second ink with p-type properties. The inks are applied to the surface of the integrated ROIC 6 and detector array 5 using a silk screen process or a stencil, in the same manner as a thick film hybrid conductor paste or solder paste might be dispensed. The quantum dot printed epoxy ink patterns are then cured under applied heat or ultraviolet light exposure, to form the quantum dot semiconducting solid regions 74 and 76 of FIG. 7C. In this manner, a detector array 5 tuned to the eye-safe wavelength of 1.55 microns may be constructed atop a completed silicon readout integrated circuit 6. In FIG. 7D, a very similar structure is shown, with the exception being there is only one quantum dot semiconducting solid region, n-type region 74. In the case of this structure, the detector element operates as a photoconductive or photoresistive element. Alternatively, in further embodiments, nanoscale structures with at least one dimension between 0.1-100 nm are used to capture photons at the desired detection wavelength. Structures such as nanofilms, nanoflakes, nanoplates, nanopillars, nanotubes, nanoshells, and nanorods have been proposed and demonstrated in literature as solutions to the problem of photon absorption and detection.

FIG. 8A is a block diagram of the unit cell electronics 66 associated with each detector element 67 of detector array 5. The input of input amplifier 78 of each unit cell electronics 66 is connected to an anode of a detector element 67 of detector array 5. The output of input amplifier 78 connects to the input of a trigger circuit 79 and to a number of sampling circuits 83. Each sampling circuit 83 behaves as an analog switch connected to a storage capacitor represented in FIG. 8A as memory cell 84. The number of sampling circuits could be sufficient to accommodate longer pulses as depicted in FIGS. 6B and 6C or multiple reflections in other embodiments. When activated by a select signal from circular selector 82, sampling circuit 83 closes an internal analog switch for a short period of time, typically less than a nanosecond, charging the internal storage capacitor of memory cell 84, and then reopens the internal analog switch, saving a sample of the input amplifier 78 output voltage. The number of sampling circuits 83 matches the number of memory cells 84. Only three memory circuits 84 are shown in FIG. 8A for the purpose of clarity, although there are many more in the example embodiment, in a typical configuration 20 to 44, though the number could exceed several hundred or even more. The sampling is accomplished by the clock 86, circular selector 82 and sampling circuits 83. Clock 86 resides outside the unit cell electronics 66, on the common portion of readout integrated circuit 6. The circular selector 82 has as many outputs as there are memory cells 84. At each pulse of clock 86, the circular selector 82 shifts, turning on a separate and independent sampling circuit 83 which connects the input amplifier 78 output to one memory cell 84. After all memory cells 84 have been filled, the memory cells 84 are overwritten as new data arrives. Consequently, the memory cells 84 are always filled with the most recently sampled waveform data. The period of clock 86 is typically much shorter than the pulse width of the reflected laser illuminating pulse, and so the reflected pulse shape is captured in the memory cells 84. If the input amplifier 78 is a transimpedance amplifier, the detector element 67 current is transformed to a voltage and the memory cells 84 sample this voltage. If the input amplifier 78 is a current amplifier, the detector element 67 current is amplified and the memory cells 84 integrate this current. The circular selector 82 is a simple sequential shift register in the example embodiment, but could be based upon an algorithm and therefore may not be sequential. Also connected to the output of input amplifier 78 is a trigger circuit 79 which is a Schmitt trigger in the example embodiment with an internal reference voltage level set globally by the common portion of readout integrated circuit 6 to detect the presence of a reflected laser transmit pulse in the output of input amplifier 78. A delay circuit 80 allows for data to continue to be accumulated in the memory cells 84 even in the case of a strong input signal or transient, so a complete picture of the reflected light pulse may be captured. When the output of the trigger circuit 79 transitions, the circular selector 82 is frozen after the delay time programmed into delay circuit 80, again allowing for sufficient time to accumulate an entire waveform of a reflected and detected laser illuminating pulse. Counter 81 accumulates the number of clock cycles fed to circular selector 82 before trigger circuit 79 transitions and freezes the circular selector 82, terminating the data acquisition period and freezing the contents of memory cells 84. Counter 81 is a 12 bit binary counter in the example embodiment, but may be more, or may be as few as 8 bits or less depending on the application. The output of the counter 81 is directly proportional to the two way time of flight of a transmitted and reflected laser illuminating pulse. The two way time of flight of a laser illuminating pulse sent from pulsed laser transmitter 2 to a reflective object in a scene in the field of view of the personal ladar sensor, and returned therefrom, is directly proportional to twice the range to the same reflective object. Both the counter output 81 and the memory cell 84 contents may be read out by readout integrated circuit 6 during the time between laser illuminating pulses. Output control 87 is a section of readout integrated circuit 6, which selects the memory cells 84 in sequence during a readout cycle of readout integrated circuit 6. Output amplifier 85 buffers the output of the selected memory cells 84 of each unit cell electrical circuit 66. Laser illuminating pulses typically occur 10-60 times per second, though faster or slower rates are also anticipated and provided for by the example embodiments described herein. The personal ladar sensor may be operated in a range gated mode, in which samples of the reflected laser light signals are analyzed by an external digital processor. In the range gated mode, large signal reflections in the near field may be ignored, or "range gated" out of the target space and objects in the targeted range space may be detected with greater sensitivity. The range gated mode is particularly effective for objects within obscuration such as fog, dust or smoke for which a triggering reflection may result from laser reflections at the edge of the cloud. Under these circumstances the trigger circuit 79 is suppressed, set at a very high threshold for example, and the sampling of each pixel is activated by the control processor 1 and unit cell circuitry at a programmed delay time or initial range. This programmed delay time is typically set to a short delay, corresponding to the near field in front of the sensor, initially. In a later illuminating pulse, the programmed delay time is increased, perhaps corresponding to a range within the obscuration and the sampling, and for sequentially later laser pulses, is turned on progressively deeper (later) so the maximum depth of the obscuration cloud may be examined for objects within its borders. Referring to FIGS. 6A and 6B, the unit cell of FIG. 8A is well suited to detect the presence and exact timing of a Gaussian shape reflected pulse of sufficient magnitude to exceed the threshold voltage level of trigger circuit 79. The discrete received samples of FIG. 6B can easily be matched to the profile of the transmitted illuminating laser pulse, and a very precise measure of delay may be made, leading to a precise timed range measurement to the reflective surface of an object or feature in the scene in the field of view of the personal ladar sensor. The unit cell of 8A performs a type of demodulation of the incoming reflected light signal, deriving the delay time between all or portions of the transmitted laser pulse waveform, and the received, detected, and amplified reflected light pulse waveform.

FIG. 8B illustrates a unit cell electronics design which is particularly well suited to the modulation scheme of FIGS. 6C and 6D, the pulsed sinewave modulation. A pulsed sinewave modulation scheme allows maximum processing gain for detecting weak or distant reflections, though with certain limitations. The reflected optical signal is detected and converted into a signal current by detector element 67, which is supplied with a detector bias voltage VDET. The range measurement made by this unit cell electronic design will be derived from a phase measurement. Two phase measuring channels are provided within the unit cell, one labeled I, and a second labelled Q in the drawing, and both with the same structure. The matched I and Q channels are provided with the output of transimpedance preamplifier 88, which converts the output current of detector element 67 into a voltage. The so-called I channel is for In-phase, or zero degrees phase shift, and the so-called Q channel is for a Quadrature, or ninety degrees phase shifted reference oscillator. The sample clock, resident on the common portion of ROIC 6 (inside dashed lines), is a sinewave signal which is a copy of the same oscillator output which drives the sinewave modulation of the pulsed laser transmitter 2, and is therefore the exact same frequency and is in fixed phase relationship to the incoming reflected optical signals for all static objects in the field of view. The sample clock provides an output FS90, and a second output FS00 to all unit cell electronics on ROIC 6. Because the input signal and sample clock are in a fixed phase relationship for static objects, if only one channel were used for measuring phase, an unfortunate situation could result if the sample clock always caused the reflected optical signal to be sampled at the minimum, or zero value. This is why two channels of phase measurement are provided, so one of the channels will be guaranteed to sample the reflected optical signal represented at the output of TIA 88 at least 45 degrees from the minimum value. The operation of the Q phase measuring channel will be described in detail, and the I channel operation is the same, though a different sample clock phase (FS00) will create complementary results. The TIA 88 output is connected to mixer 89 which may be a Gilbert cell, XOR gate, or phase/frequency discriminator of other type. Mixer 89 is provided with a 90 degree phase delayed sample clock FS90, so short pulses proportional to the phase difference are output and presented at the input of integrator 90. The integrator 90 has a reset input (R), and a bandwidth control (BW), both global inputs provided by the common portion of ROIC 6, and determined by inputs from control processor 1. The BW control input allows control processor 1 to adapt the unit cell electronics optimally to other system performance parameters, and to variations in the scene in the field of view of the personal ladar sensor. The voltage output of the integrator 90 is essentially the time-averaged value of the sine or cosine of the phase difference between the input sinewave derived from the reflected optical signal, and the reference oscillator sinewave FS90. The BW control provides a selectable level of low-pass filtering, which can reduce the effects of system noise on the phase measurement, or allow for faster responses when fewer cycles of sinewave modulation are applied to pulsed laser transmitter 2. The output of integrator 90 is then buffered by fixed gain amplifier 91. Fixed gain amplifier 91 provides an output to voltage comparator 92 and to analog sampling gate 94. A threshold voltage VTH is set globally by the threshold reference voltage generator VTHG, which is part of the common portion of ROIC 6. The threshold voltage is determined by control processor 1 based on the status of other system parameters and also the characteristics of the scene in the field of view of the personal ladar sensor. Typically the threshold voltage is set at least high enough to prevent the voltage comparator 92 from triggering on noise signals, but may be set even higher to improve the accuracy of the phase measurement if desired. Once the output voltage of fixed gain amplifier 91 exceeds the preset threshold voltage VTH, the voltage comparator 92 will switch from a low to high state, and the output of voltage comparator 92 will then drive the output of latch 93 to a high, or logic "1" state. The output of latch 93, PDQ (phase detected quadrature) indicates there is sufficient signal in the Q channel to make a proper phase measurement. Analog sampling gate 94 samples the value of the fixed gain amplifier 91 when the logic signal PL is applied, and the resulting analog value is stored on memory cell 3 95, which also has an analog unity gain output buffer amplifier to drive the PQ (phase in Q channel) output line. The logic signal PL may transition from a low to a high depending on several factors. The PL signal is created by a logic block, Peak Logic 98, which is embedded in each unit cell electronic circuit, and which operates on two local inputs PDQ and PDI, as well as two global inputs PPKS and MODE. The MODE input to Peak Logic 98 selects the PDQ and PDI inputs and locks out the PPKS input if MODE is a high, or logic "1". In this case, the first transition from low to high by either PDQ or PDI will result in a high transition of PL. A high transition of PL will cause both the analog values of PQ and PI to be sampled and held on memory circuits memory 3 and memory 2 (95), respectively. In this normal mode (MODE=1), the unit cell will latch the phase measurements in both the I and Q channels as soon as either channel exceeds the threshold voltage VTH, indicating a useful phase measurement has been made. If the MODE input to Peak Logic 98 is low or logic "0", the PDQ and PDI inputs will be locked out, and the PL output will transition low to high when the PPKS input transitions low to high. Since PPKS is a global input from the common portion of ROIC 6, this unusual mode (MODE=0), allows a preset timing for measurement of phase to be selected by control processor 1. The PL logic signal also initiates an analog sampling of the Peak Detect circuit 96 output by analog switch 97, which is stored on memory cell 1 99, and buffered through an output unity gain amplifier as an analog output level (PK). The Peak Detect circuit 96 measures the maximum amplitude of the TIA 88 output during a measurement window, and has both a reset (R) input, and a bandwidth control (BW). Reset (R) is asserted prior to each phase measurement cycle, and in effect, opens a measurement "window". The bandwidth control input (BW) to Peak Detect circuit 96 controls the positive ramp rate at which the Peak Detect circuit 96 attacks, or follows the peak output level of TIA 88, and also affects the decay rate of the peak detect circuit 96, and is an important control parameter utilized by control processor 1 to produce optimal results. The in-phase, or I channel produces in like manner a PI analog output level which is directly proportional to the sine or cosine of the phase of the output sinewave from TIA 88, but referenced to the zero-degree phase shifted output of the sample clock, FS00. When the data reduction processor 11 during a readout cycle is in the process of determining range or phase indicated by the response of detector element 67, it may consider a single phase measurement, typically of the strongest or first reacting channel (I or Q), or a ratio of the two channels (I/Q), and the level of confidence may be indicated by the voltage level of PK. Because the analog voltages PI and PQ represent the sine or cosine of the I or Q channel phase measurement, the data reduction processor must use an arcsin, arccosine, or arctan function (in the case of a ratio measurement) to accurately determine the fixed phase relationship between outbound illuminating modulation, and the received I or Q channel sinewave. Finally, the Output Control block 100 resident on the common portion of ROIC 6, selects analog levels PK, PI, and PQ to be output at preselected intervals through the Analog Multiplexer AM1 and unity gain analog buffer amplifier A1 as analog output PIQP. PIQP is provided as an input to A/D converters 10 for use by data reduction processor 11 in determining range, and for use by control processor 1 as feedback data in optimizing system performance. The Output Control block 100 also controls Digital Mux DM resident on the common portion of ROIC 6 to select and output the digital indicator signals PDI and PDQ as digital output PDIQ, at predetermined intervals for use by data reduction processor 11 in determining range and for use by control processor 1 as feedback data. The sample clock outputs FS90 and FS00 may be sinewave outputs or digital squarewave outputs without loss of functionality, or reduction in beneficial effect, and the circuits will operate in a like manner. The unit cell of 8B performs a second type of demodulation of the incoming reflected light signal, deriving the delay time or phase between all or portions of the transmitted laser pulse waveform, and the received, detected, and amplified reflected light pulse waveform.

FIG. 8C shows a third unit cell electronics variation which is well suited to any one of the three modulation schemes represented by FIGS. 6A and 6B, 6C and 6D, or 6E and 6F. It is an implementation of a matched filter which uses a sum of weighted samples to detect the presence of a signature modulation waveform or pulse or series of pulses which has been imposed on pulsed laser transmitter 2. Each detector element 67 of detector array 5 is supplied with a bias voltage VDET by the ROIC 6. The detector element 67 converts the incident light pulse into an electrical current signal. This current signal is representative of the incident light pulse which has been reflected from a feature in the scene in the field of view of the personal ladar sensor. The transimpedance amplifier 88 converts the electrical current into a signal voltage with the same shape as the incoming reflected light pulse. The output of TIA 88 is provided to an analog sampling gate 101, numbered S1. Analog sampling gate S1 101 also has a sample clock input which receives a sample clock Fs and an output which connects to an associated analog memory register cell MR1 102 which stores an analog sample of the voltage presented at the input of sampling gate S1 on the positive transition of the sample clock Fs. Memory register cell MR1 provides a buffered output to a second analog sampling gate S2 and to a variable gain weighting amplifier 103 with gain a1. The second analog sampling gate S2 also has a sample clock input which receives sample clock Fs and connects to a second memory register cell MR2. Likewise, the output of memory register cell MR2 provides a buffered output to a second variable gain weighting amplifier with a gain a2 and to a third analog sampling gate S3. The third analog sampling gate S3 also has a sample clock input which receives sample clock Fs and connects to a third memory register cell MR3. The output of memory register cell MR3 provides a buffered output to a third variable gain weighting amplifier with a gain a3, and to any additional analog sampling gates which might be in an alternative embodiment. With each cycle of the sample clock Fs supplied to the sampling gates S1-S3, the waveform present at the TIA output 88 is advanced through a structure which functions as an analog shift register 111, shown in FIG. 8C within the dashed line boundary. In this drawing only three analog sampling gates 101 are shown for clarity, but the number can be upwards of several hundred in many applications providing an analog shift register 111 with many hundreds of cells. The sampling clock Fs is provided by the common portion of the ROIC 6. Counter 112 is typically a 12-16 bit counter which receives and counts the sampling clock Fs which is provided by the common portion of ROIC 6. Therefore, counter 112 records the number of pulses of sample clock Fs which cause the analog samples of the TIA 88 output to ripple through the analog shift register 111. The output of each analog memory cell 102 is connected to the non-inverting input of an associated weighting amplifier 103. Each weighting amplifier 103 has a normalized gain which typically varies from −1 to 1. Each weighting amplifier 103 has a voltage variable gain control input (G1-G3 in this case), though the number of analog memory cells 102 and weighting amplifiers 103 can be upwards of several hundred. The inverting input of each of the weighting amplifiers 103 is connected to a reference voltage VR which is the output of the averaging circuit 101C. The output of the TIA 88 is provided both to a positive peak detector PPD 101B and a negative peak detector NPD 101A. Each peak detector NPD 101A, and PPD 101B has a bandwidth control and reset input (not shown) controlled by the common portion of ROIC 6 and programmable from control processor 1. The positive peak detector PPD 101B tracks the maximum amplitude in the TIA 88 output, and the negative peak detector NPD 101A tracks the minimum voltage in the TIA 88 output. The bandwidth control common to both PPD 101B and NPD 101A controls both the attack and decay rates of the peak detecting circuits and also the sensitivity to any high frequency noise in the output of TIA 88, and is driven by the common portion of ROIC 6 and is programmable by an external controller, in this case control processor 1. Once the minimum and maximum peak voltages are determined by NPD 101A and PPD 101B, the voltages from the outputs of NPD 101A and PPD 101B are summed together and divided by two by the average calculating circuit 101C, producing a mid-level voltage VR which is halfway between the peak positive and peak negative excursion of the output voltage of TIA 88. The outputs of all of the weighting amplifiers 103 are connected to a summing junction 104, which provides an analog sum of the weighted inputs to the non-inverting input of a voltage comparator 105. The voltage comparator 105 inverting input is provided with a threshold voltage $V_{THR}$ from the common portion of ROIC 6. Once the voltage representing the sum of the weighted outputs exceeds the threshold voltage at the inverting input, voltage comparator 105 transitions from a logic low "0" output to a logic high "1" output. A logic "1" $C_{TH}$ output from voltage comparator 105 indicates the presence of a pulse of a particular shape, or a sequence of pulses with a particular timing. Referring to FIG. 8J, the waveform shape 802 of the autocorrelation function for the Barker-7 code sequence is shown. This is also roughly the waveshape which would be present at the output of summing junction 104 if a Barker-7 coded pulse train were being received through TIA 88 and sampled by the sampling network described above. In order to properly detect a Barker-7 code sequence, there should be at minimum 2-3 samples during each pulse of the sequence, (particularly if the pulses are not flat-topped) as in the example of the Gaussian pulse of FIG. 6A. If the pulse is a rectangular pulse, a minimum of one sample per pulse from TIA 88 is required. For a rectangular pulse, an absolute minimum of 7 sampling gates and memory cells would therefore be required in the sampling network for the Barker-7 code sequence shown in FIG. 6G, though a larger number of sampling gates 101 would be recommended. For a Barker-7 coded sequence of Gaussian pulses, a minimum number of 21 sampling gates and memory cells would be recommended in order to realize the full processing gains achievable through the Barker coding scheme. Of course, the waveform of FIG. 8J would not be reproduced exactly by the output of summing junction 104, due to the effects of circuit impedances, parasitic capacitances and inductances, amplifier slew rates, etc. For these reasons, it is necessary to freeze the sample counter 112 at the moment the voltage comparator 105 output transitions to a "1", in order to have a first approximation for the time-of-arrival of the light pulse reflected from the scene and incident upon detector element 67. A look at the waveform of FIG. 8J with the $V_{THR}$ line superimposed shows a symmetric rise and fall, which would indicate the center of the waveform is halfway between the initial trigger of voltage comparator 105, and the second transition of voltage comparator 105 from a logic "1" to a logic "0" on the falling edge of the summing junction 104 output. To provide a measure of this delay, delay counter 106 of 12-16 bits is provided with a fast clock (x)Fs by the common portion of ROIC 6, typically 8 times the frequency of the sample clock Fs, though higher speeds are envisioned. The output $C_{TH}$ of voltage comparator 105 acts as an asynchronous enable input to delay counter 106, providing for accurate determination of the timing of the initial transition 0-1 as well as the secondary transition 1-0 of the voltage comparator 105 output $C_{TH}$. Delay counter 106 provides an output $C\Delta$, typically a 12-16 bit word which represents the time the output of summing junction 104 remains above the threshold voltage $V_{THR}$. Peak detect circuit 113 allows control processor 1 to monitor the strength of signal in the receive channel associated with the unit cell electronics of each individual detector element 67. Peak detect circuit 113 holds the peak analog voltage of summing junction 104 on a storage capacitor with an output buffering amplifier providing an output to analog multiplexer 108. The peak detect circuit 113 is reset prior to the transmission of each illuminating laser pulse by a reset input R generated by the common portion of ROIC 6. The attack rate and in some cases the decay rate of peak detect circuit 113 may be controlled globally by the common portion of ROIC 6 via the bandwidth control output BW. Analog multiplexer 108 is an analog multiplexer with an eight bit digital selector input driven by the output control block 109 resident on the common portion of ROIC 6. Output amplifier 107 provides buffering capability for analog multiplexer 108, and drives the analog output line $S_{OUT}$, which provides a sequence of analog samples upon initiation of the output sequence from control processor 1. An 8-bit control bus for analog multiplexer 108 in the example embodiment of FIG. 8C implies there will be a maximum of 255 sample gates 101 and memory cells 102, since one analog input must be reserved for the output of peak detect circuit 113. However, a wider control bus of 12-16 bits is also envisioned for other applications where longer sequences or the chirped sinewave modulation of FIG. 6C might be used. The gain control block 110 provides analog output voltages G1, G2, G3, . . . GN which are used in the voltage variable gain weighting amplifiers 103. Gain control block 110 is a series of digital to analog converters, or may be a single D/A converter with switched output and multiple analog memory cells to hold the values of G1, G2, G3, . . . GN. A reset function is provided globally by the common portion of ROIC 6 not particular to the unit cell electronics, and which zeroes the position of analog shift register 111, counter 112, and delay counter 106. The analog shift resister 111 functions in a manner similar to the circular selector 82 and sample gates 83 of FIG. 8A, providing analog samples of the received waveform in a predetermined sequence, and these circuits may be used interchangeably in either unit cell electronic circuit, depending on other design considerations. The unit cell electronics structure of FIG. 8C provides excellent pulse detection capability and is adaptable to a number of pulse shape and pulse sequence scenarios. The unit cell of 8A performs a third type of demodulation of the incoming reflected light signal, deriving the delay time between all or portions of the transmitted laser pulse waveform, and the received, detected, and amplified reflected light pulse waveform.

FIGS. 8D-8I illustrate in greater detail certain common functional elements appearing in the unit cell electronics embodiments detailed herein as FIGS. 8A, 8B, and 8C. FIG. 8D shows a transimpedance amplifier (TIA) which appears as item 88 in FIGS. 8B & 8C, and is also a example embodiment for input amplifier 78 in FIG. 8A. The TIA may be realized as a single stage amplifier or a multi-stage amplifier as shown in FIG. 8D. The first stage of the amplifier is a lower gain transimpedance amplifier 120 with external resistor 114, followed by a fixed gain stage 121 with a fixed gain A. Because it is very difficult to produce high quality resistors by diffusion into a silicon integrated circuit, such as is used typically in the design of ROIC 6, it can be useful to realize the feedback external resistor 114 on the surface of readout integrated circuit 6, or within the metallic connecting and conducting layers. Shown in FIG. 8E is a thin film external resistor 114 deposited on the surface of the ROIC 6, and generally within the boundaries of the unit cell electronics associated with each detector element 67 of detector array 5. Thin film external resistor 114 may be of nickel-chromium, tantalum nitride, ruthenium oxide, lead oxide, bismuth ruthenate, bismuth iridate, or other known metal film or ceramic-metal resistive compound, or it may be a polysilicon resistor which may also be ion-implanted. The resistive film forming external resistor 114 may be applied as a film by sputtering, physical vapor deposition, or high vacuum technique in the example embodiment. Alternatively, the resistive compounds for external resistor 114 may be applied in a thick film paste or ink created from the resistive compound in a fine particle powder mixed with an epoxy or other polymer, and a glass frit powder. The paste or ink may be applied by silk screening or stencil, and the glass may have a low melting temperature (LTCC). This alternative resistor forming method is known as a thick film technique, and is well described in the literature. In either case, the external resistor 114 formed by thin film or thick film methods should make connection with two metal pads 115 brought to the surface of ROIC 6. A first one of the metal pads 115 is connected to the inverting input of TIA 120, and a second of the metal pads 115 is connected to the output of TIA 120. Shown at the left of FIG. 8E is the surface of the unit cell electronics area of ROIC 6 including external resistor 114 and metal pads 115 prior to any further processing of ROIC 6 which might include application of other films for the purpose of light detection. Shown at the right of FIG. 8E is the surface of the unit cell electronics area of ROIC 6 after further processing involving the application of insulating films, conductive films, and light detecting films. Shown in FIG. 8F is an integrator of the type described as item 90 in FIG. 8B. Typically, the integrator 90 is a series resistor RI and a parallel charge storage capacitor $C_{INT}$. A reset function with control input R is implemented by an analog switch 116 connected from the charge storage point to a common ground reference for discharging the charge stored on storage capacitor $C_{INT}$. FIG. 8G shows further details of an integrator with bandwidth control and reset of the type identified as item 90 in FIG. 8B. The resistor RI of FIG. 8F is replaced by a field effect transistor 117 configured as a voltage controlled variable resistor. The source contact of field effect transistor 117 is connected to the charge storage capacitor $C_{INT}$ and to the reference input REF of bootstrap voltage bias block 119. Bootstrap voltage bias block 119 adds the bandwidth control voltage input BW to the REF input, and produces the output VB+, which biases field effect transistor 117 appropriately to maintain an adjustable constant resistance channel from the drain to source of FET 117. The reset analog switch 116 of FIG. 8F is realized as a field effect transistor 118, which is switched on by application of a positive voltage at the R input connected to the gate contact of field effect transistor 118, and then switched off prior to transmission of illuminating pulses from pulsed laser transmitter 2.

FIG. 8H shows a peak detector with reset of the type indentified as item 96 in FIG. 8B, and as item 113 in FIG. 8C. Series capacitor 123 and parallel connected resistor 122 form a basic high pass filter, so the peak detector only responds to pulses which are of the width transmitted by pulsed laser transmitter 2, typically in the range of 5-50 nanoseconds. Diode 124 rectifies the pulses and adds charge to peak hold capacitor $C_P$ only if the voltage at the anode of diode 124 exceeds the voltage at the peak hold capacitor $C_P$ by the diode forward anode-cathode voltage drop. Analog switch 125 discharges peak hold capacitor $C_P$ prior to the transmission of a scene illuminating laser pulse from pulsed laser transmitter 2. FIG. 8I details the circuit realizations of the peak detector circuit of FIG. 8H and shows the bandwidth control mechanism. The fixed resistor R of FIG. 8H is replaced by the variable resistance channel of a field effect transistor 126 with a control voltage BW applied at the gate contact of FET 126. This variable resistance channel together with series capacitor 123 forms a variable bandwidth high pass filter, which may be tuned to accommodate the different pulse widths and pulse encoding stratagems used to modulate pulsed laser transmitter 2. The reset switch 125 is implemented as a field effect transistor 127 which is turned on to discharge peak hold capacitor $C_P$, and then switched off prior to transmission of scene illuminating pulses from pulsed laser transmitter 2. FIG. 8J illustrates a special property of Barker codes using the Barker-7 code as an example. Barker codes are sequences of ones and zeroes designed to have a high autocorrelation at a single relative delay and a low autocorrelation at any other relative delay. The autocorrelation function 802 is a measure of the usefulness of the code in resolving range ambiguities. The autocorrelation chart of 8J may be thought of as two Barker-7 codes superimposed on each other, and the two waveforms moved past each other one chip (pulse width) at a time. Where the two waveforms match, a 1 is added to the sum. Where the two waveforms do not match, a "1" is subtracted from the sum. It can be seen the maximum possible sum of 3.5 is only the result when the two waveforms are identically superimposed on each other. Any other delay relationship of +/−1, 2, 3, 4, 5, 6, or 7 results in low autocorrelation sums.

Figure 9A:
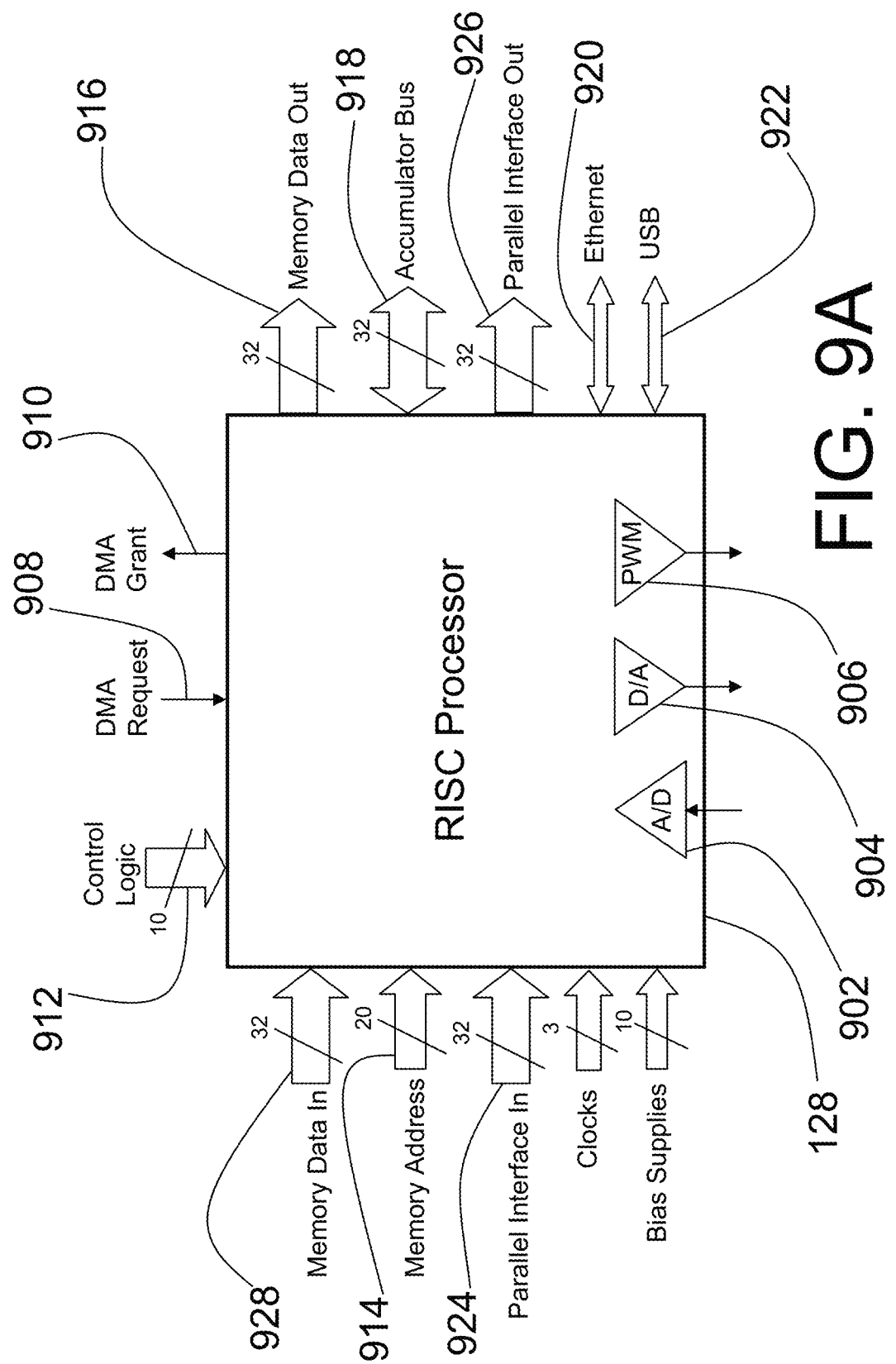
FIG. 9A shows an overall block diagram of the reduced instruction set microprocessor developed for data reduction and control of the personal ladar sensor; and, FIG. 9B is a functional block diagram of the reduced instruction set microprocessor developed for data reduction and control of the personal ladar sensor, realized with five separate dedicated purpose connection busses.

FIG. 9A shows a block diagram of a reduced instruction set computing (RISC) processor 128 designed to function in several key roles required by the personal ladar sensor of the instant invention. Referring back to FIG. 1, the RISC processor 128 may function as the control processor 1, the data reduction processor 11, and, in some applications, the object tracking processor 17. RISC processor/controller 128 may have several optional features which are very useful in control applications, such as an onboard analog-to-digital (A/D) converter 902 with 8, 10 or 12 bit resolution. RISC processor/controller 128 may also have an onboard digital-to-analog (D/A) converter 904 with 8, 10, or 12 bit output, and a pulse width mode (PWM) controller 906 with an output for controlling peripheral devices which may have analog or PWM control inputs. There may be several A/D and D/A converters on the RISC processor 128, and there may also be several PWM controllers and PWM control outputs on the RISC processor 128. Additionally, RISC processor 128 has a number of features which are well adapted to the processing of raw 3-D data in the role of a data reduction processor 11. First, the RISC processor 128 features the internal capacity of 100 thousand words of 32-bit main memory. This allows space for the main program as well as full frames of data to be read in to the RISC processor 128 and to be operated on in parallel. In the case of the example embodiment, a detector array 5 of 128×128 detector elements 67, the capacity of 100K words of 32-bit memory is sufficient. For detector arrays 5 of 256×256 or 512×512, memory capacity may have to be increased beyond 100K words. Internal main memory on the RISC processor 128 single chip computer allows for very fast loading of operands, storing of intermediate results, and storing of full frames of processed data. A second important feature of RISC processor 128 is the hardware encoded math functions for both integer and floating point operations. All basic integer math operations in the RISC processor 128 are hardware encoded for fast execution, including AND, addition, subtraction, multiplication, division, shift left, shift right, complement, increment, decrement, and absolute value. The RISC processor 128 also features hardware encoded floating point operations including addition, subtraction, multiplication, division, square root, rounding, fix, float, and change sign operators. The RISC processor 128 also is well suited to multi-processing applications where additional processing power might be required, having direct memory access (DMA) capability through the DMA Request 908 and DMA Grant 910 lines. A Control Logic bus 912 allows the RISC processor 128 to be controlled in a number of ways. During startup, the Control Logic bus orders a process which includes; cycling through the built-in-test (BIT), loading main memory from external flash memory, sequencing the application of internal bias voltages, and configuration of other selectable parameters such as clock speed, interrupt enable/disable and interrupt timeout limits. The Control Logic bus may also be used in select circumstances to step through program sequences, override interrupts, and provide for an orderly shut-down of the RISC processor 128. The Memory Data In bus 928 is a full 32 bits wide, as is the internal bus structure of the RISC processor 128. During startup, the operating program for the data reduction processor would be loaded into the RISC processor 128 by advancing the Memory Address 20-bit bus 914 synchronously with the 32-bit Memory Data In contents. The 32-bit Memory Data Out bus 916 may be used to output a frame or partial frame of raw amplitude and range data, adjusted amplitude and range data, or contents of memory, including intermediate results and/or program status in a debug mode. The contents of the accumulator may also be loaded with an initial value, constant, or result from a second processor, or may be read out at any time through the bidirectional Accumulator Bus 918 which is a full 32-bits wide. The RISC processor 128 also provides communications ports for both serial communications such as Ethernet 920 and USB 922, and parallel communications using the Parallel Interface In 924 and Parallel Interface Out 926 busses which are both full 32-bit wide parallel paths. The present design of the RISC processor 128 requires 3 independent clock frequency inputs and 10 external bias supplies, though these requirements may be reduced in future definitions of the RISC processor 128. The RISC processor 128, so called because of the limited number of operation codes available to the programmer, is configured to provide maximum throughput for the mathematical operations common to the task of the data reduction processor 11. Part of this high throughput is due to the streamlined architecture of the RISC processor 128, and part is due to the very fast clock speeds of 1 GHz and higher which are achievable in the advanced 28 nanometer digital silicon processes now commercially available. During normal operation when functioning as the data reduction processor 11, the RISC processor 128 will typically adjust each electronic amplitude value associated with an individual detector element 67 of the detector array 5 for dark current or offset, linearity, conversion efficiency, frequency response, and saturation effects. RISC processor 128 may also make adjustment of the raw counts associated with target range by adjusting the initial timing offset, and by processing the received pulse shapes using piecewise linear estimation, square law, or exponential curve fitting. RISC processor 128 may also operate on a series of raw digitized samples of the reflected light waveform, and run algorithms on these samples to implement an ideal matched filter, in some cases based on a fast Fourier transform (FFT), and in other situations based on a finite impulse response (FIR) filter. RISC processor 128 may implement still other multi-point digital processing algorithms which perform parametric estimation of time-of-arrival and amplitude or intensity. The RISC processor 128 also is capable of functioning as a general purpose controller given the right programming, and may function as the control processor 1 in FIG. 1 to control the entire personal ladar system. RISC processor 128 may also be used as the Object Tracking processor 17 in FIG. 1 under certain circumstances. When the object to be tracked can be simply defined, then a rules-based algorithm may be used to track the desired object and RISC processor 128 may function quite capably. An example of rules based object tracking is the tracking of a cone shaped drogue which trails from an aerial tanker for in-flight aerial refueling. This application seeks primarily an ellipse or circle of points in the field of view of the ladar sensor, and has been successfully addressed using rules based algorithms which can run on a RISC processor 128 such as defined herein. Of course, the personal ladar sensor is not envisioned to be used in aerial refueling applications, but the example is useful nonetheless, as it provides an illustration of the types of rules based object tracking which could easily be done in a personal ladar sensor using the RISC processor 128 definition. A personal ladar sensor might make use of rules based object tracking to follow a ball, bat, Frisbee, discus, javelin, RC airplane, or semaphore. More complicated schemes of object tracking requiring full frame digital filtering, image or resolution enhancements, point of view translation, rendering, or full matrix operations may also be contemplated for the RISC processor 128 in applications where lower frame rates or real-time processing may not be essential. For real-time tracking of complex objects with the observing platform in motion, or at high frame rates, a graphical processing unit (GPU) may be required.

Figure 9B:
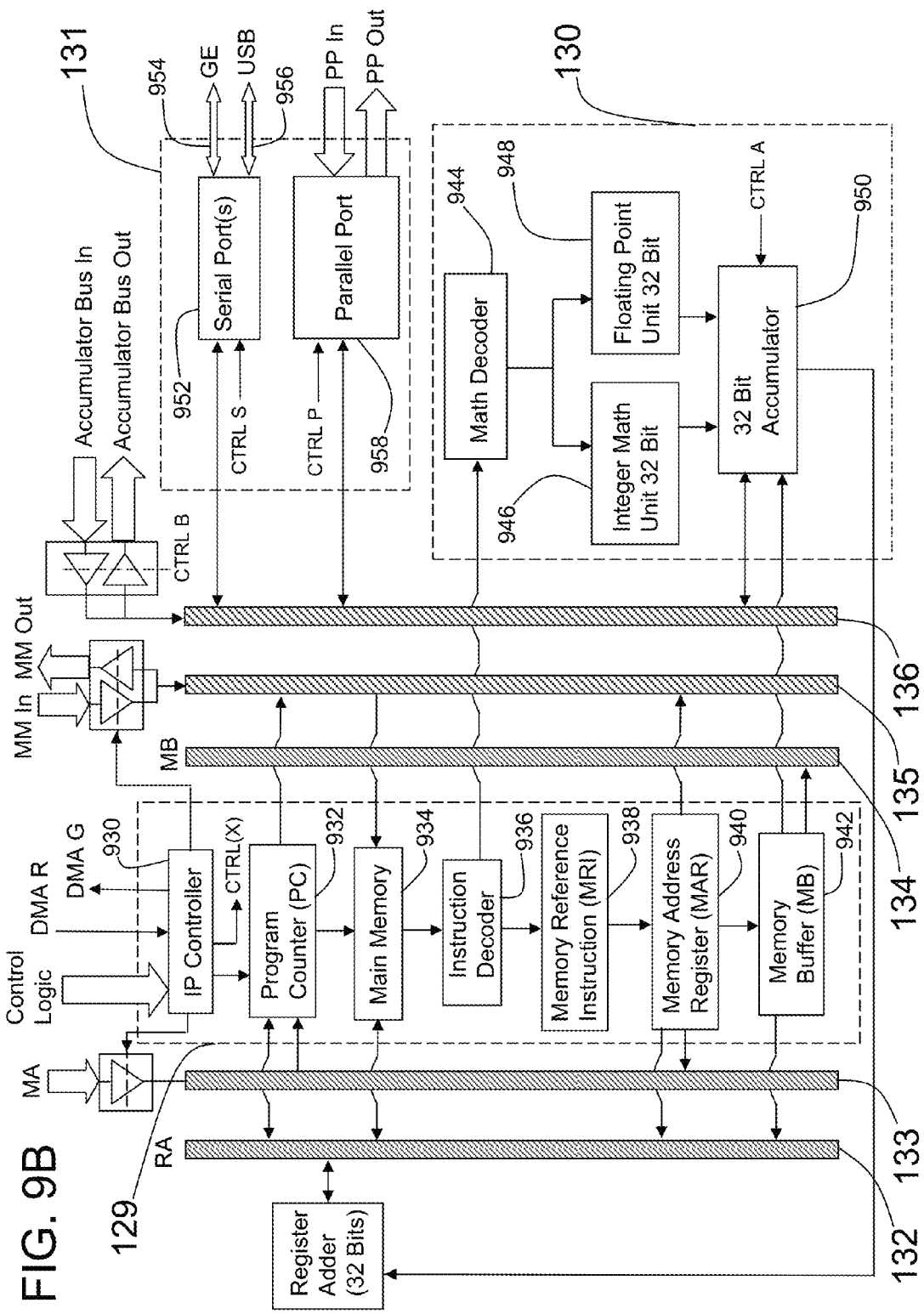

FIG. 9B shows the internal architecture of the RISC processor 128. Dashed lines enclose the elements of the Instruction Processor 129, the Math Processor 130, and the Communications Processor 131, the major functional blocks of the RISC processor 128. Five internal busses carry most of the data, instructions, and control commands, the Register Adder (RA) bus 132, the Memory Address (MA) bus 133, the Memory Buffer (MB) bus 134, the Main Memory (MM) bus 135, and the Accumulator (AC) bus 136. The Instruction Processor 129 is an Instruction Processor (IP) Controller 930, Program Counter (PC) 932, Main Memory 934, Instruction Decoder 936, Memory Reference Instruction (MRI) processor 938, a Memory Address Register (MAR) 940, and a Memory Buffer (MB) 942. The functional blocks of the Instruction Processor 129 are shown connected by single lines for clarity in the drawing, though there are many additional connections not shown between these functional blocks in the Instruction Processor 129. Math Processor 130 is a Math Decoder 944, Integer Math Unit 946, Floating Point Unit 948, and 32-bit Accumulator 950. The functional blocks of the Math Processor 130 are shown connected by single lines for clarity in the drawing, though there are many additional connections not shown between these functional blocks in the Math Processor 130. Communications Processor 131 includes a Serial Port functional block 952 with Gigabit Ethernet 954 and USB serial 956 ports, and a Parallel Port functional block 958 with full 32-bit pathways both in and out.

Having now described various embodiments of the disclosure in detail as required by the patent statutes, those skilled in the art will recognize modifications and substitutions to the specific embodiments disclosed herein. Such modifications are within the scope and intent of the present disclosure as defined in the following claims.

What is claimed is:

1. An apparatus for personal scene detection comprising:
a personal ladar sensor with a field of view and a wavelength of operation having
   a semiconductor laser with a modulated laser light output and a diffusing optic for illuminating a scene in the field of view of said personal ladar sensor,
   a two dimensional array of light sensitive detectors positioned at a focal plane of a light collecting and focusing system, each of said light sensitive detectors with an output producing an electrical response signal from a reflected portion of said modulated laser light output,
   a readout integrated circuit with a plurality of unit cell electrical circuits, each of said unit cell electrical circuits having an input connected to one of said light sensitive detector outputs, each said unit cell electrical circuit having an electrical response signal demodulator and a range measuring circuit connected to an output of said electrical response signal demodulator, said range measuring circuit further connected to a reference signal providing a zero range reference for the said modulated laser light output, a detector bias circuit connected to at least one voltage distribution grid of said array of light sensitive detectors, and a temperature stabilized frequency reference;

said personal ladar sensor mounted inside a radome attached to a personal electronic device, said radome comprising at least one transparent surface capable of transmitting light at said wavelength of operation.

2. The apparatus of claim 1 wherein said personal electronic device is selected from the set comprising a cell phone, a handheld personal digital assistant (PDA), a still camera, a video camera, a headgear, a helmet, a portable computer, a tablet computer.

3. The apparatus of claim 1 wherein said personal electronic device further comprises a voice communications link.

4. The apparatus of claim 1 wherein said personal electronic device further comprises a visual feedback device.

5. The apparatus of claim 4 wherein said visual feedback device comprises a flat panel display.

6. The apparatus of claim 1 wherein said personal electronic device further comprises a visible light camera.

7. The apparatus of claim 1 wherein said light collecting and focusing system is a zoom lens.

8. The apparatus of claim 7 wherein said zoom lens further comprises a piezoelectric actuator.

9. The apparatus of claim 7 wherein said zoom lens further comprises a deformable refracting element.

10. The apparatus of claim 9 wherein said deformable refracting element is a microfluidic lens.

11. The apparatus of claim 1 wherein said semiconductor laser is a vertical cavity surface emitting laser.

12. The apparatus of claim 11 wherein said vertical cavity surface emitting laser is a hybrid structure comprised of a plurality of substrates bonded together.

13. The apparatus of claim 1 wherein said modulated laser light output is modulated with a waveform selected from the set of a single Gaussian pulse profile, multiple Gaussian profile pulses, a single flat-topped pulse profile, multiple flat-topped pulses, a pulsed sinewave and a chirped sinewave pulse.

14. The apparatus of claim 13 wherein said waveform is multiple Gaussian profile pulses and said multiple Gaussian profile pulses are encoded using a Barker code.

15. The apparatus of claim 13 wherein said waveform is multiple flat-topped pulses and said multiple flat-topped pulses are encoded using a Barker code.

16. The apparatus of claim 1 wherein said two dimensional array of light sensitive detectors is mounted directly to said readout integrated circuit.

17. The apparatus of claim 1 wherein said two dimensional array of light sensitive detectors is formed on the surface of said readout integrated circuit using at least one compound containing quantum dots.

18. The apparatus of claim 1 wherein said two dimensional array of light sensitive detectors is formed on a surface of said readout integrated circuit using a plurality of nanostructures selected from the set of nanofilms, nanoflakes, nanoplates, nanopillars, nanotubes, nanoshells, and nanorods.

19. The apparatus of claim 1 wherein said electrical response signal demodulator comprises:

an input amplifier with an output connected to a trigger circuit;

a series of analog sampling gates, each sampling gate with an associated analog memory cell, a sample clock controlling the timing of each of said sampling gates, a selector for selecting each of said sampling gates in sequence, a counter for counting the number of samples, an output amplifier with an input connected to each of said analog memory cells, an output control for selecting a sequence of said analog memory cell contents to be output through said output amplifier, and wherein an input of an external analog to digital converter is connected to said output amplifier, an output of said analog to digital converter is connected to an input of a digital processor and produces a sequence of digitized analog samples of said electrical response signal, and said digital processor is programmed to demodulate said electrical response signal by operating on the sequence of digitized analog samples using a digital processing algorithm.

20. The apparatus of claim 1 wherein said electrical response signal demodulator comprises:

an input amplifier with an output connected to a first input of a phase comparator, said phase comparator having a first phase reference signal connected to a second input, an output of said phase comparator connected to the input of an integrator, said integrator having an integrator output with an output voltage proportional to the difference in phase between said first input and said second input of said phase comparator.

21. The apparatus of claim 20 wherein said integrator output is further connected to the input of a buffer amplifier, said buffer amplifier having an output connected to a first input of a voltage comparator and to an input of an analog sampling gate, said voltage comparator having a second input connected to a threshold voltage, said sampling gate further having a sample clock input and an output connected to a first analog memory cell, said analog memory cell storing an analog voltage proportional to said difference in phase between said first input and said second input of said phase comparator.

22. The apparatus of claim 20 wherein said input amplifier has an output connected to a first input of a second phase comparator, said second phase comparator having a second input connected to a second phase reference signal, said second phase comparator having an output connected to an input of a second integrator, said second integrator having a second integrator output with an output voltage proportional to the difference in phase between said first input and said second input of said second phase comparator.

23. The apparatus of claim 22 wherein said second integrator output is further connected to an input of a second buffer amplifier, said second buffer amplifier with an output connected to a first input of a second voltage comparator and to an input of a second analog sampling gate, said second voltage comparator having a second input connected to a threshold voltage, and said second sampling gate further having a sample clock input and an output connected to a second analog memory cell, said second analog memory cell storing an analog voltage proportional to said difference in phase between said first input and said second input of said second phase comparator.

24. The personal ladar sensor of claim 22 wherein said second phase reference differs in phase from said first phase reference by a minimum of 45 degrees.

25. The personal ladar sensor of claim 22 wherein said second phase reference differs in phase from said first phase reference by approximately 90 degrees.

26. The personal ladar sensor of claim 21 wherein said first analog memory cell has an output which is sampled by an input of an analog to digital converter, said analog to digital converter having a first digitized output voltage representative of a phase measurement to a first phase reference, said first digitized output voltage connected to an input of a digital processor, said digital processor computing a range to a reflective feature in a scene in the field of view of said personal ladar sensor by using a sequence of digital operations on said first digitized output voltage representative of a phase measurement to a first phase reference.

27. The apparatus of claim 26 wherein said digital processor computes a range to a reflective feature in a scene in the field of view of said personal ladar sensor by using a sequence of digital operations which operate on both said first digitized output voltage representative of a phase measurement to a first phase reference, and a second digitized output voltage representative of a phase measurement to a second phase reference.

28. The apparatus of claim 20 wherein said input amplifier has an output connected to a peak detector circuit.

29. The apparatus of claim 1 wherein said electrical response signal demodulator comprises:
an input amplifier with an output connected to an analog shift register comprised of a plurality of analog sampling gates, each sampling gate with a sample clock input connected to a sample clock output, each of said plurality of analog sampling gates activated in a prearranged sequence by a sampling clock output, and each sampling gate with an output connected to an analog memory cell, each memory cell with an output connected to an input of a weighting amplifier, an output of each weighting gain amplifier connected to a summing junction, said summing junction having a summing junction output connected to a first input of a voltage comparator, said voltage comparator having a second input connected to a threshold voltage, said voltage comparator having a logic output, said voltage comparator logic output signaling when said summing junction output exceeds said threshold voltage,
a counter connected to said sampling clock output, said counter started counting by a reference signal from said zero range reference, and said counter stopped counting when said voltage comparator logic output signals when said summing junction output exceeds said threshold voltage.

30. The apparatus of claim 29 further comprising a second counter which is started counting when said voltage comparator logic output signals when said summing junction output exceeds said threshold voltage, and said second counter stopped counting when said voltage comparator logic output signals when said threshold voltage exceeds said summing junction output.

31. The apparatus of claim 1 wherein said readout circuit further comprises a plurality of thin film resistors deposited on a surface of said readout integrated circuit.

32. The apparatus of claim 1 wherein said readout circuit further comprises a plurality of thick film resistors deposited on a surface of said readout integrated circuit.

33. The apparatus of claim 1 wherein said readout circuit further comprises a plurality of metal oxide film resistors.

34. The apparatus of claim 1 wherein said readout circuit further comprises a plurality of thin film resistors formed of a metal and ceramic compound.

35. The apparatus of claim 1 wherein said readout circuit further comprises a plurality of thin film resistors, each thin film resistor having a first end connected to an inverting input of an amplifier circuit of said unit cell electrical circuit, and each thin film resistor with a second end connected to an output of said amplifier circuit.

36. The apparatus of claim 1 wherein said readout circuit further comprises a plurality of thick film resistors, each thick film resistor with a first end connected to an inverting input of an amplifier circuit of said unit cell electrical circuit, and each thick film resistor with a second end connected to an output of said amplifier circuit.

37. The apparatus of claim 1 wherein said readout circuit further comprises a plurality of thin film resistors applied via physical vapor deposition to a surface of said readout integrated circuit.

38. The apparatus of claim 1 wherein said readout circuit further comprises a plurality of thick film resistors applied via stencil to a surface of said readout integrated circuit.

39. The apparatus of claim 20 wherein said integrator further incorporates a reset capability.

40. The apparatus of claim 20 wherein said integrator further incorporates a bandwidth control.

41. The apparatus of claim 28 wherein said peak detector incorporates a reset capability.

42. The apparatus of claim 28 wherein said peak detector further incorporates a bandwidth control.

43. A personal ladar sensor with a field of view and a wavelength of operation mounted to a personal electronic device, and said personal ladar sensor being mounted inside a radome attached to said personal electronic device, and said radome comprising at least one transparent surface capable of transmitting light at said wavelength of operation, said personal ladar sensor further comprising a semiconductor laser with a modulated laser light output and a diffusing optic for illuminating a scene and at least one light reflecting feature in the field of view of said personal ladar sensor, and a two dimensional array of light sensitive detectors positioned at a focal plane of a light collecting and focussing system, and each of said light sensitive detectors with an output producing an electrical response signal from a light signal, and said light signal produced by reflection from a feature in the scene in a field of view of said personal ladar sensor, a readout integrated circuit with a plurality of unit cell electrical circuits, and each of said unit cell electrical circuits with an input connected to one of said light sensitive detector outputs, and said unit cell electrical circuit with an electrical response signal demodulator, and a range measuring circuit connected to an output of said electrical response signal demodulator, and said range measuring circuit further connected to a reference signal providing a zero range reference for said modulated laser light output,
said personal ladar sensor further comprising a detector bias circuit connected to at least one voltage distribution grid of said array of light sensitive detectors, and a temperature stabilized frequency reference clock,
said electrical response signal demodulator comprising an input amplifier with an output connected to an analog shift register comprised of a plurality of analog sampling gates, and each sampling gate with an associated analog memory cell, and a sample clock controlling the timing of each of said sampling gates, said sample clock derived from said temperature stabilized frequency reference clock, and a selector for selecting each of said sampling gates in sequence, and a counter for counting the number of samples, and an output amplifier with an input connected to each of said analog memory cells, and an output control for selecting a sequence of said analog memory cell contents to be output through said output amplifier, and further comprising an input of an analog to digital converter connected to said output amplifier, and an output of said analog to digital converter connected to an input of a digital data processor and producing a sequence of digitized analog samples of said electrical response signal, and said digital data processor programmed to demodulate said electrical response signal by operating on aforesaid sequence of digitized analog samples using a digital processing algorithm, and said digital data processor and digital processing algorithm producing a measurement of range to said light reflecting feature in said field of view of said personal ladar sensor.

44. The personal ladar sensor of claim 43 wherein said digital data processor resides on a single silicon substrate, and said digital data processor further comprises at least 100 thousand words of main memory, and said words of main memory at least 32 bits in width.

45. The personal ladar sensor of claim 43 wherein said digital data processor resides on a single silicon substrate, and said digital data processor further comprises a hardware encoded floating point mathematics unit.

46. The personal ladar sensor of claim 43 wherein said digital data processor resides on a single silicon substrate, and said digital data processor further comprises a hardware encoded integer math unit.

47. The personal ladar sensor of claim 43 wherein said digital data processor resides on a single silicon substrate, and said digital data processor further comprises a serial communications port.

48. The personal ladar sensor of claim 43 wherein said serial communications port comprises an Ethernet port.

49. The personal ladar sensor of claim 43 wherein said serial communications port comprises a USB port.

50. The personal ladar sensor of claim 43 wherein said digital data processor resides on a single silicon substrate, and said digital data processor further comprises a parallel communications port.

51. The personal ladar sensor of claim 43 wherein said digital data processor resides on a single silicon substrate, and said digital data processor further comprises a direct memory access capability.

52. A modular ladar sensor with a field of view and a wavelength of operation, said modular ladar sensor further comprising:
 a semiconductor laser with a modulated laser light output and a diffusing optic for illuminating a scene in the field of view of said modular ladar sensor, and a two dimensional array of light sensitive detectors positioned at a focal plane of a light collecting and focusing system, and each of said light sensitive detectors with an output producing an electrical response signal from a reflected portion of said modulated laser light output, a readout integrated circuit with a plurality of unit cell electrical circuits, and each of said unit cell electrical circuits with an input connected to one of said light sensitive detector outputs, and said unit cell electrical circuit with an electrical response signal demodulator, and a range measuring circuit connected to an output of said electrical response signal demodulator, and said range measuring circuit further connected to a reference signal providing a zero range reference for said modulated laser light output,
 a detector bias circuit connected to at least one voltage distribution grid of said array of light sensitive detectors, and a temperature stabilized frequency reference,
 said readout integrated circuit connected to a portable computer at a distal end of a cable, said cable having at least one transmission line within, and said cable further having a plug at a proximal end connecting to said portable computer.

53. The modular ladar sensor of claim 52 wherein said cable further comprises at least one electrical conductor.

54. The modular ladar sensor of claim 52 wherein said cable further comprises at least one fiber optic transmission line.

55. The modular ladar sensor of claim 52 wherein said cable further comprises at least one coaxial transmission line.

56. The modular ladar sensor of claim 52 wherein said cable further comprises at least one twisted pair of electrical conductors comprising a transmission line.

57. The modular ladar sensor of claim 52 wherein a peripheral port of said portable computer provides power to said modular ladar sensor.

58. The modular ladar sensor of claim 57 wherein said peripheral port is selected from the set of a USB port, a serial communications port, a parallel communications port, a network communications port.

59. The modular ladar sensor of claim 52 wherein said peripheral port is an Ethernet port.

60. A modular ladar sensor with a field of view and a wavelength of operation, said modular ladar sensor further comprising a semiconductor laser with a modulated laser light output and a diffusing optic for illuminating a scene in the field of view of said modular ladar sensor, and a two dimensional array of light sensitive detectors positioned at a focal plane of a light collecting and focussing system, and each of said light sensitive detectors with an output producing an electrical response signal from a reflected portion of said modulated laser light output, a readout integrated circuit with a plurality of unit cell electrical circuits, and each of said unit cell electrical circuits with an input connected to one of said light sensitive detector outputs, and said unit cell electrical circuit with an electrical response signal demodulator, and a range measuring circuit connected to an output of said electrical response signal demodulator, and said range measuring circuit further connected to a reference signal providing a zero range reference for said modulated laser light output,
and said modular ladar sensor further comprising a detector bias circuit connected to at least one voltage distribution grid of said array of light sensitive detectors, and a temperature stabilized frequency reference,
said modular ladar sensor connected through a connector plug to a receptacle of a portable computer, and said connector plug mounted to said modular ladar sensor, and connecting to said receptacle of said portable computer.

61. The modular ladar sensor of claim 60 wherein the connector further comprises at least one electrical conductor.

62. The modular ladar sensor of claim 60 wherein the connector further comprises at least one fiber optic connecting member.

63. The modular ladar sensor of claim 52 wherein the cable further comprises at least one coaxial connecting member.

64. The apparatus of claim 1 wherein said personal electronic device further comprises an audio feedback device.

65. The apparatus of claim 64 wherein said audio feedback device is a headphone.

66. The apparatus of claim 64 wherein said audio feedback device is a hearing aid type.

67. The apparatus of claim 64 wherein said audio feedback device is worn in the ear canal.

68. The apparatus of claim 64 wherein said audio feedback device is a cochlear implant.

69. The apparatus of claim 1 wherein said light collecting and focusing system comprises at least one diffractive optic.

70. The apparatus of claim 1 wherein said modulated laser light output is modulated with a pulsed sinewave, and said pulsed sinewave may be switched between a plurality of frequencies.

* * * * *